US012596888B2

(12) United States Patent
Jauhar et al.

(10) Patent No.: US 12,596,888 B2
(45) Date of Patent: Apr. 7, 2026

(54) CONTEXTUALIZATION OF GENERATIVE LANGUAGE MODELS BASED ON ENTITY RESOURCE IDENTIFIERS

(71) Applicant: Microsoft Technology Licensing, LLC, Redmond, WA (US)

(72) Inventors: Sujay Kumar Jauhar, Kirkland, WA (US); Silviu-Petru Cucerzan, Redmond, WA (US); Nirupama Chandrasekaran, Kirkland, WA (US); Allen Herring, Sammamish, WA (US); Jinheon Baek, Seoul (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 18/529,910

(22) Filed: Dec. 5, 2023

(65) Prior Publication Data

US 2025/0148219 A1 May 8, 2025

Related U.S. Application Data

(60) Provisional application No. 63/595,909, filed on Nov. 3, 2023.

(51) Int. Cl.

| | |
|---|---|
| ***G06F 40/40*** | (2020.01) |
| ***G06F 16/28*** | (2019.01) |
| ***G06F 16/9535*** | (2019.01) |
| ***G06F 40/30*** | (2020.01) |
| ***G06N 5/02*** | (2023.01) |

(52) U.S. Cl.
CPC ............ *G06F 40/40* (2020.01); *G06F 16/288* (2019.01); *G06F 16/9535* (2019.01); *G06N 5/02* (2013.01)

(58) Field of Classification Search
CPC .... G06F 40/40; G06F 16/288; G06F 16/9535; G06F 40/30; G06F 40/295; G06N 5/02; G06N 3/088
USPC ........................................ 704/8-9, 231, 251
See application file for complete search history.

(56) References Cited

U.S. PATENT DOCUMENTS 10,810,193 B1 10/2020 Subramanya et al.

OTHER PUBLICATIONS

"GPT-4 Technical Report", In Repository of arXiv:2303.08774v1, Mar. 15, 2023, 100 Pages.
Ahmad, et al., "Context Attentive Document Ranking and Query Suggestion", In Proceedings of 42nd International ACM SIGIR Conference on Research and Development in Information Retrieval, Jul. 21, 2019, 10 Pages.
Ahmad, et al., "Multi-Task Learning for Document Ranking and Query Suggestion", In Proceedings of 6th International Conference on Learning Representations, Feb. 15, 2018, pp. 1-14.
Anil, et al., "PaLM 2 Technical Report", In Repository of arXiv:2305.10403v1, May 17, 2023, pp. 1-93.

(Continued)

*Primary Examiner* — George C Monikang
(74) *Attorney, Agent, or Firm* — Rainier Patents, P.S.

(57) ABSTRACT

The disclosed concepts relate to contextualization of generative language models. In some implementations, a linked entity database is populated with entity resource identifiers of entities extracted from a search log by an entity linker. A contextualized prompt data structure is generated based on the linked entity database, e.g., by including linked entity context information in the contextualized prompt data structure. A response to the contextualized prompt data structure is received, where the response is conditioned on the linked entity context information.

20 Claims, 12 Drawing Sheets

(56) References Cited

OTHER PUBLICATIONS

Baek, et al., "Knowledge-Augmented Language Model Prompting for Zero-Shot Knowledge Graph Question Answering", In Proceedings of 1st Workshop on Natural Language Reasoning and Structured Explanations, Jun. 13, 2023, pp. 78-106.
Bodigutla, Praveen Kumar, "High Quality Related Search Query Suggestions using Deep Reinforcement Learning", In Repository of arXiv:2108.04452v1, Aug. 10, 2021, 7 Pages.
Brown, et al., "Language models are few-shot learners", In Proceedings of 34th International Conference on Neural Information Processing Systems, Dec. 6, 2020, 25 Pages.
Cao, et al., "Autoregressive Entity Retrieval", In 9th International Conference on Learning Representations,, May 3, 2021, pp. 1-20.
Chen, et al., "Abstractive Snippet Generation", In Proceedings of The Web Conference, Apr. 20, 2020, pp. 1309-1319.
Chen, et al., "Attention-based Hierarchical Neural Query Suggestion", In Proceedings of 41st International ACM SIGIR Conference on Research & Development in Information Retrieval, Jul. 8, 2018, pp. 1093-1096.
Chen, et al., "Personalized Query Suggestion Diversification", In Proceedings of 40th International ACM SIGIR Conference on Research and Development in Information Retrieval, Aug. 7, 2017, pp. 817-820.
Chen, et al., "When Large Language Models Meet Personalization: Perspectives of Challenges and Opportunities", In Repository of arXiv:2307.16376v1, Jul. 31, 2023, 24 Pages.
Cheng, et al., "Long Short-Term Session Search: Joint Personalized Reranking and Next Query Prediction", In Proceedings of the Web Conference, Apr. 19, 2021, pp. 239-248.
Chowdhery, et al., "PaLM: Scaling Language Modeling with Pathways", In Repository of arXiv:2204.02311v1, Apr. 5, 2022, 83 Pages.
Cohen, Jacob, "A Coefficient of Agreement for Nominal Scales", In Journal of Educational and psychological measurement, Apr. 1960, pp. 37-46.
Cucerzan, Silviu, "Large-Scale Named Entity Disambiguation Based on Wikipedia Data", In Proceedings of Joint Conference on Empirical Methods in Natural Language Processing and Computational Natural Language Learning, Jun. 28, 2007, pp. 708-716.
Cucerzan, Silviu, "The MSR System for Entity Linking at TAC 2012", http://research.microsoft.com/en-us/people/silviu/tac12.pdf, 2012, 6 Pages.
Dai, et al., "Uncovering ChatGPT's Capabilities in Recommender Systems", In Proceedings of 17th ACM Conference on Recommender Systems, Sep. 18, 2023, pp. 1126-1132.
Dehghani, et al., "Learning to attend, copy, and generate for session-based query suggestion", In Proceedings of ACM on Conference on Information and Knowledge Management, Nov. 2017, pp. 1747-1756.
Devlin, et al., "BERT: Pre-training of Deep Bidirectional Transformers for Language Understanding", In Proceedings of NAACL-HLT, Jun. 2019, pp. 4171-4186.
Ding, et al., "Generating High-Quality Query Suggestion Candidates for Task-Based Search", In 40th European Conference on IR Research in Advances in Information Retrieval, Mar. 26, 2018, 6 Pages.
Dodge, Yadolah, "Spearman Rank Correlation Coefficient", In the Concise Encyclopedia of Statistics, 2008.
Fan, et al., "Recommender Systems in the Era of Large Language Models (LLMs)", In Repository of arXiv:2307.02046v2, Aug. 5, 2023, 19 Pages.
Friedman, et al., "Leveraging Large Language Models in Conversational Recommender Systems", In Repository of arXiv:2305.07961v1, May 13, 2023, 24 Pages.
Garigliotti, et al., "Generating Query Suggestions to Support Task-Based Search", In Proceedings of 40th International ACM SIGIR Conference on Research and Development in Information Retrieval, Aug. 2017, pp. 1153-1156.
Geng, et al., "Recommendation as Language Processing (RLP): A Unified Pretrain, Personalized Prompt & Predict Paradigm (P5)", In Proceedings of 16th ACM Conference on Recommender Systems, Sep. 18, 2022, pp. 299-315.
Hou, et al., "Large Language Models as Zero-Shot Conversational Recommenders", In Repository of arXiv:2308.10053v1, Aug. 19, 2023, 11 Pages.
Hsu, et al., "Answer Generation for Retrieval-based Question Answering Systems", In Findings of the Association for Computational Linguistics: ACL-IJCNLP 2021, Aug. 1, 2021, pp. 4276-4282.
Ji, et al., "GenRec: Large Language Model for Generative Recommendation", In Repository of arXiv:2307.00457v2, Jul. 4, 2023, 4 Pages.
Jiang, et al., "Personalized Query Suggestion With Diversity Awareness", In Proceedings of IEEE 30th International Conference on Data Engineering, Mar. 31, 2014, 12 Pages.
Jiang, et al., "RIN: Reformulation Inference Network for Context-Aware Query Suggestion", In Proceedings of 27th ACM International Conference on Information and Knowledge Management, Oct. 22, 2018, pp. 197-206.
Kang, et al., "Do LLMs Understand User Preferences? Evaluating LLMs on User Rating Prediction", In Repository of arXiv:2305.06474v1, May 10, 2023, 11 Pages.
Kang, et al., "KALA: Knowledge-Augmented Language Model Adaptation", In Conference of the North American Chapter of the Association for Computational Linguistics: Human Language Technologies, Jul. 10, 2022, pp. 5144-5167.
Kharitonov, et al., "Intent Models for Contextualising and Diversifying Query Suggestions", In Proceedings of 22nd ACM International Conference on Information and Knowledge Management, Oct. 27, 2013, 8 Pages.
Komeili, et al., "Internet-Augmented Dialogue Generation", In Proceedings of 60th Annual Meeting of the Association for Computational Linguistics vol. 1: Long Papers, May 22, 2022, pp. 8460-8478.
Lampinen, et al., "Can language models learn from explanations in context?", In Findings of the Association for Computational Linguistics, Dec. 7, 2022, pp. 537-563.
Lazaridou, et al., "Internet-augmented language models through few-shot prompting for open-domain question answering", In Repository of arXiv:2203.05115v2, May 23, 2022, 20 Pages.
Lei, et al., "Unsupervised Dense Retrieval with Relevance-Aware Contrastive Pre-Training", In Findings of the Association for Computational Linguistics, Jul. 9, 2023, pp. 10932-10940.
Lewis, et al., "BART: Denoising Sequence-to-Sequence Pre-training for Natural Language Generation, Translation, and Comprehension", In Proceedings of 58th Annual Meeting of the Association for Computational Linguistics, Jul. 5, 2020, pp. 7871-7880.
Li, et al., "Large Language Models for Generative Recommendation: A Survey and Visionary Discussions", In Repository of arXiv:2309.01157v1, Sep. 3, 2023, 11 Pages.
Li, et al., "Teach LLMs to Personalize—An Approach inspired by Writing Education", In Repository of arXiv:2308.07968v1, Aug. 15, 2023, 10 Pages.
Liu, et al., "Is ChatGPT a Good Recommender? A Preliminary Study", In Repository of arXiv:2304.10149v3, Oct. 27, 2023, 10 Pages.
Liu, et al., "RoBERTa: A Robustly Optimized BERT Pretraining Approach", In Journal of arXiv:1907.11692v1, Jul. 26, 2019, 13 Pages.
Lyu, et al., "LLMRec: Personalized Recommendation via Prompting Large Language Models", In Repository of arXiv:2307.15780v2, Aug. 16, 2023, 16 Pages.
Mallen, et al., "When Not to Trust Language Models: Investigating Effectiveness and Limitations of Parametric and Non-Parametric Memories", In Repository of arXiv:2212.10511v4, Jul. 2, 2023, 19 Pages.
Mel, et al., "Query Suggestion Using Hitting Time", In Proceedings of 17th ACM Conference on Information and Knowledge Management, Oct. 2008, 9 Pages.

(56) References Cited

OTHER PUBLICATIONS

Mustar, et al., "On the Study of Transformers for Query Suggestion", In Journal of ACM Transactions on Information Systems, vol. 40, No. 1, Oct. 2021, 27 Pages.

Mustar, et al., "Using BERT and BART for Query Suggestion", In Joint Conference of the Information Retrieval Communities in Europe, Jul. 2020, 6 Pages.

Park, et al., "Generative Agents: Interactive Simulacra of Human Behavior", In Repository of arXiv:2304.03442v2, Aug. 6, 2023, 22 Pages.

Petroni, et al., "Language Models as Knowledge Bases?", In Proceedings of Conference on Empirical Methods in Natural Language, Sep. 4, 2019, 11 Pages.

Zhou, et al., "Personalized Query Suggestion with Searching Dynamic Flow for Online Recruitment", In Proceedings of the 31st ACM International Conference on Information & Knowledge Management, Oct. 17, 2022, pp. 2773-2783.

Radford, et al., "Improving Language Understanding by Generative Pre-Training", In Technical Report, OpenAI, Jun. 11, 2018, 12 Pages.

Raffel, et al., "Exploring the Limits of Transfer Learning with a Unified Text-to-Text Transformer", In Journal of Machine Learning Research, vol. 21, Issue 140, Jun. 20, 2020, pp. 1-67.

Ram, et al., "In-context retrieval-augmented language models", In Repository of arXiv:2302.00083v3, Aug. 1, 2023, 15 Pages.

Roberts, et al., "How Much Knowledge can you Pack into the Parameters of a Language Model?", In Proceedings of Conference on Empirical Methods in Natural Language Processing, Feb. 10, 2020, 9 Pages.

Salemi, et al., "LaMP: When Large Language Models Meet Personalization", In Repository of arXiv:2304.11406v2, May 19, 2023, 23 Pages.

Sanh, et al., "Multitask prompted training enables zero-shot task generalization", In Proceedings of the Tenth International Conference on Learning Representations, Mar. 17, 2022, pp. 1-216.

Shi, et al., "REPLUG: Retrieval-Augmented Black-Box Language Models", In Repository of arXiv:2301.12652v1, Jan. 30, 2023, 12 Pages.

Shuster, et al., "BlenderBot 3: a deployed conversational agent that continually learns to responsibly engage", In Repository of arXiv:2208.03188v1, Aug. 5, 2022, 38 Pages.

Sordoni, et al., "A Hierarchical Recurrent Encoder-Decoder for Generative Context-Aware Query Suggestion", In Proceedings of 24th ACM International on Conference on Information and Knowledge Management, Oct. 2015, pp. 553-562.

Sung, et al., "Can Language Models be Biomedical Knowledge Bases?", In Proceedings of Conference on Empirical Methods in Natural Language Processing, Nov. 7, 2021, pp. 4723-4734.

Thoppilan, et al., "Lamda: Language models for dialog applications", In Repository of arXiv:2201.08239v1, Jan. 20, 2022, pp. 1-47.

Touvron, et al., "Llama 2: Open Foundation and Fine-Tuned Chat Models", In Repository of arXiv:2307.09288v2, Jul. 19, 2023, 77 Pages.

Touvron, et al., "LLaMA: Open and Effcient Foundation Language Models", In Repository of arXiv:2302. 13971v1, Feb. 29, 2023, 27 Pages.

Vaswani, et al., "Attention is all you Need", In Proceedings of 31st Conference on Neural Information Processing Systems, Dec. 4, 2017, 11 Pages.

Vu, et al., "Personalised Query Suggestion for Intranet Search with Temporal User Profiling", In Proceedings of Conference on Conference Human Information Interaction and Retrieval, Mar. 7, 2017, pp. 265-268.

Wang, et al., "RecMind: Large Language Model Powered Agent for Recommendation", In Repository of arXiv:2308.14296v1, Aug. 28, 2023, 11 Pages.

Wei, et al., "Finetuned Language Models are Zero-Shot Learners", In Proceedings of International Conference on Learning Representations, Apr. 25, 2022, 46 Pages.

Wei, et al., "Larger language models do in-context learning differently", In Repository of arXiv:2303.03846v2, Mar. 8, 2023, 51 Pages.

Wu, et al., "A Survey on Large Language Models for Recommendation", In Repository of arXiv:2305.19860v4, Aug. 18, 2023, 13 Pages.

Wu, et al., "TidyBot: Personalized Robot Assistance with Large Language Models", In Repository of arXiv:2305.05658v2, Oct. 11, 2023, 21 Pages.

Yang, et al., "PALR: Personalization Aware LLMs for Recommendation", In Repository of arXiv:2305.07622v3, Jun. 7, 2023, 5 Pages.

Yu, et al., "Generate rather than Retrieve: Large Language Models are Strong Context Generators", The Proceedings of Eleventh International Conference on Learning Representations, May 1, 2023, pp. 1-27.

Zhang, et al., "Memory-Augmented LLM Personalization with Short- and Long-Term Memory Coordination", In Repository of arXiv:2309.11696v2, Sep. 28, 2023, 9 Pages.

Zhang, et al., "Personalizing Dialogue Agents: I Have a Dog, do you Have Pets Too?", In Proceedings of 56th Annual Meeting of the Association for Computational Linguistics, Jul. 15, 2018, pp. 2204-2213.

Zhong, et al., "Personalized Query Suggestions", In Proceedings of 43rd International ACM SIGIR Conference on Research and Development in Information Retrieval, Jul. 25, 2020, pp. 1645-1648.

International Search Report and Written Opinion received for PCT Application No. PCT/US2024/052171, mailed on Feb. 5, 2025, 19 pages.

"Bing Search," Microsoft Bing, Retrieved from the internet archives at https://www.bing.com on Nov. 2, 2023, 2 Pages.

"My Karma hub," Retrieved from the internet archives at https://www.mykarmahub.com on Sep. 28, 2023, 3 Pages.

Baek, et al., "Knowledge-Augmented Large Language Models for Personalized Contextual Query Suggestion," Proceedings of the ACM on Web Conference, May 17, 2024, pp. 3355-3366.

Samarati, et al., "Protecting privacy when disclosing information: κ-anonymity and its enforcement through generalization and suppression," Rederived from internet https://dataprivacylab.org/dataprivacy/projects/kanonymity/paper3.pdf, 1998, 19 Pages.

Wikipedia, "Spearman's Rank Correlation Coefficient," retrieved from the internet archives at https://en.wikipedia.org/wiki/Spearman%27s_rank_correlation_coefficient <https://url.us.m.mimecastprotect.com/s/Qgs9C73MywUE0G1Ri8humT?domain=en.wikipedia.org>, Sep. 25, 2023, 11 Pages.

Wu, et al., "Scalable zero-shot entity linking with dense entity retrieval," In Repository of arXiv:1911.03814, Sep. 29, 2020, 11 Pages.

600

602

You are an AI assistant whose primary goal is to suggest a next search query, in order to help a user search and find information better on the search engine. Two different queries and entities are separated by the token '|'. For example, 'giraffe' and 'zebra' would appear as 'giraffe' | 'zebra'

You are going to suggest a search query that the user would search next based on the current query, the current session, the current article, and the personal entities.

The explanations of the query, session, article, and personal entities are as follows:

- The query is a specific set of phrases that the user enters into the search engine to find the information or resources related to a particular topic, question, or interest.
- The session refers to a sequence of queries requested by the user on the search engine, within a certain period of time or with regard to the completion of a task.
- The article refers to a specific webpage that the user clicks and reads from several search results displayed by the search engine in response to the requested query.
- The personal entity refers to a topic, keyword, person, event, or any subject that is specifically relevant or appealing to the individual user based on their personal interests.

Read the following query, session, article, and personal entities of the user as the context information, which might be helpful and relevant to suggest the next query.

604

Query: {Query}
Session: {Session}
Article Title: {Article['Title']} Article Text: {Article['Text']}
Personal Entities: {Entities}

606

Based on the above query, session, article, and personal entities, please generate one next query suggestion with the rationale, in the format of:

Query Suggestion:
Rationale:

FIG. 6

CONTEXTUALIZATION OF GENERATIVE LANGUAGE MODELS BASED ON ENTITY RESOURCE IDENTIFIERS

BACKGROUND

In recent years, generative language models have demonstrated tremendous capability at generating natural language text. For instance, generative language models can summarize existing documents, help users draft new documents, and conduct natural language conversations with users at a very high level. Given adequate training data, a generative language model can learn to be adept at almost any language-generating task. However, generative language models can be extremely large, e.g., having billions of parameters. As a consequence, training generative language models for new tasks tends to require massive amounts of training data and associated computational resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to contextualization of generative language models. One example includes a method or technique that can include inputting a search log to an entity linker. The search log can include web search queries submitted by a user to obtain web search results from a search engine and clicked web pages selected by the user from the web search results. The method or technique can also include receiving, from the entity linker, first linked entity resource identifiers of first linked entities identified by the entity linker by processing the search log. The method or technique can also include populating a linked entity database with the first linked entity resource identifiers received from the entity linker. The method or technique can also include receiving a current natural language query from the user and generating a contextualized prompt data structure that is based at least on the current natural language query and linked entity context information derived from the linked entity database. The method or technique can also include inputting the contextualized prompt data structure to a generative language model and receiving a response to the contextualized prompt data structure generated by the generative language model. The response is conditioned on the linked entity context information. The method or technique can also include replying to the current natural language query based at least on the response.

Another example entails a system that includes a linked entity database storing first linked entity resource identifiers of linked entities identified by an entity linker by processing a search log for a user, a hardware processing unit, and a storage resource storing computer-readable instructions. When executed by the hardware processing unit, the computer-readable instructions can cause the system to receive a current natural language query from the user and generate a contextualized prompt data structure that includes at least the current natural language query and linked entity context information derived from the linked entity database. The computer-readable instructions can also cause the system to input the contextualized prompt data structure to a generative language model and receive a response to the current natural language query generated by the generative language model. The response is conditioned on the linked entity context information included in the contextualized prompt data structure. When executed by the hardware processing unit, the computer-readable instructions can cause the system to reply to the current natural language query based at least on the response.

Another example includes a computer-readable storage medium storing computer-readable instructions which, when executed by a processing unit, cause the processing unit to perform acts. The acts can include receiving a current natural language query from a user and accessing a linked entity database storing first linked entity resource identifiers of linked entities identified by an entity linker by processing a search log for the user. The acts can also include generating a contextualized prompt data structure that includes at least on the current natural language query and linked entity context information derived from the linked entity database. The acts can also include inputting the contextualized prompt to a generative machine learning model and receiving a response to the contextualized prompt generated by the generative machine learning model. The response is conditioned on the linked entity context information. The acts can also include replying to the current natural language query based at least on the response.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 6 shows an example of a prompt template that can be used to contextualize a query to a generative language model, consistent with some implementations of the present concepts.

DETAILED DESCRIPTION

Overview

Figure 1:
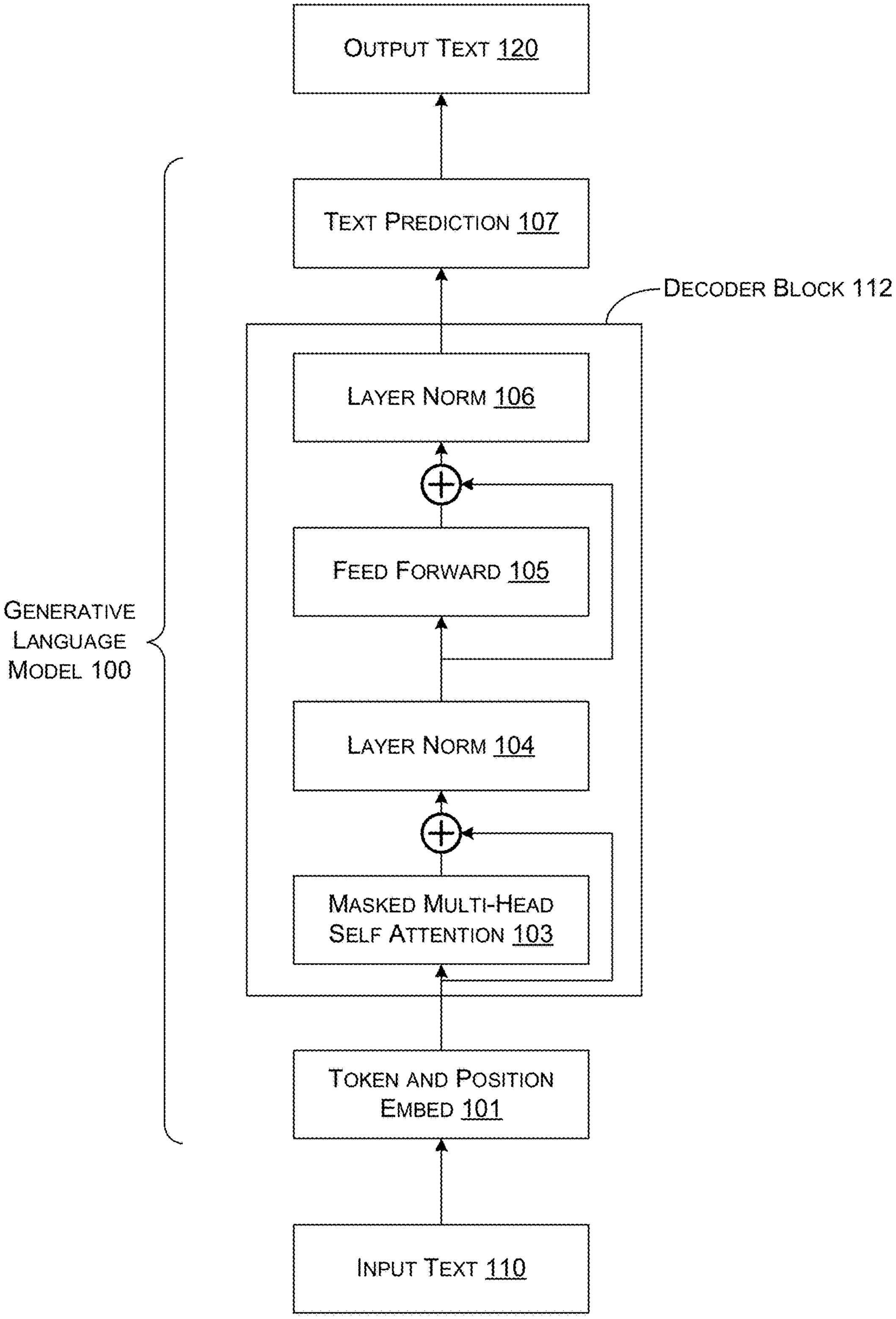
FIG. 1 illustrates an example of a generative language model, consistent with some implementations of the present concepts.

Recent advances in language modeling, such as transformer-based generative language models (e.g., one or more versions of models such as GPT, BLOOM, PaLM, and/or LLaMA), have enabled language models to perform complex tasks for users. For instance, generative language models perform well at tasks such as engaging in dialogs with users, summarizing documents for users, etc. Some generative language models have even achieved milestones such as passing the bar exam.

Generative language models can learn to perform these complex tasks by being exposed to training data relating to a wide range of concepts. As a consequence, massive amounts of training data are generally involved in training a generative language model. In order to effectively represent the knowledge obtained from the training data, generative language models tend to be extremely large, having billions or trillions of parameters.

Because of the large size of these generative language models, it is difficult to use training techniques to tune them for specific users, as there is generally insufficient training data for a single user to tune a generative model. Moreover, tuning a generative language model can also utilize significant computational resources (processor, memory, storage, etc.) involved in the tuning process. Another way to adapt a generative language model for a specific user is to augment prompts with additional information, such as a sequence of past interactions by the user with a search engine or browser or a user profile. However, these approaches tend to involve utilizing a great deal of user-specific data, which can exceed the contextual memory limit of a generative language model.

Using the disclosed techniques, a search log associated with a user can be processed to tag strings with linked entity resource identifiers, e.g., uniform resource locators ("URLs") of entities mentioned in the search log. The linked entity resource identifiers can map to a larger knowledge base of entity resource locators (e.g., Wikipedia or other public knowledge base URLs). The linked entity resource locators can be used to populate a linked entity database, and the linked entity database can be used to generate contextualized prompt data structures that are input to a generative language model. By contextualizing the prompt data structures with linked entity context information, the generative language model can be conditioned to generate responses that are based on the user's search history from the search log.

Machine Learning Overview

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters to adapt the model for one or more specific tasks. In some cases, the pretraining can involve a self-supervised learning process on unlabeled pretraining data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

Terminology

For the purposes of this document, the term "language model" refers to any type of automated agent that understands natural language and/or communicates via natural language. For instance, a language model can be implemented as a neural network, e.g., a decoder-based generative language model such as GPT, BLOOM, PaLM, and/or LLaMA or variants thereof, a long short-term memory model, etc. The term "generative model," as used herein, refers to a machine learning model employed to generate new content. Generative models can be trained to predict items in sequences of training data. When employed in inference mode, the output of a generative model can include new sequences of items that the model generates. A "generative language model" is a model trained from one or more sources of natural language training data to predict a sequence of output tokens given one or more input tokens. A generative language model can generate new sequences of text given some input prompt, e.g., a query potentially with some additional context. In some cases, a generative model can be multi-modal, e.g., in addition to textual inputs and/or outputs, the model may be capable of using images, audio or other modalities as inputs and/or generating images, audio, or other modalities as outputs. A "large" generative language model is a generative language model with one billion or more parameters.

The term "prompt," as used herein, refers to input text provided to a generative language model that the generative language model uses to generate output text. A prompt can include a query, e.g., a request for information from the generative language model. A prompt can also include context, or additional information that the generative language model uses to respond to the query. In some cases, a prompt can include one or more examples for the generative language model as context (e.g., "few-shot prompting), and can condition the generative language model to generate more accurate responses than the generative model would produce without the examples. The term "in-context learning," as used herein, refers to learning, by a generative model, from examples input to the model at inference time, where the examples enable the generative model to learn without performing explicit training, e.g., without updating model parameters using supervised, unsupervised, or semi-supervised learning.

The term "machine learning model" refers to any of a broad range of models that can learn to generate automated user input and/or application output by observing properties of past interactions between users and applications. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels or rewards. The term "user-specific model" refers to a model that has at least one component that has been trained or constructed at least partially for a specific user. Thus, this term encompasses models that have been trained entirely for a specific user, models that are initialized using multi-user data and tuned to the specific user, and models that have both generic components trained for multiple users and one or more components trained or tuned for the specific user. Likewise, the term "application-specific model" refers to a model that has at least one component that has been trained or constructed at least partially for a specific application.

The term "pruning" refers to removing parts of a machine learning model while retaining other parts of the machine learning model. For instance, a large machine learning model can be pruned to a smaller machine learning model for a specific task by retaining weights and/or nodes that significantly contribute to the ability of that model to perform a specific task, while removing other weights or nodes that do not significantly contribute to the ability of that model to perform that specific task. A large machine learning model can be distilled into a smaller machine learning model for a specific task by training the smaller machine learning model to approximate the output distribution of the large machine learning model for a task-specific dataset.

Example Decoder-Based Generative Language Model

FIG. 1 illustrates an exemplary generative language model 100 (e.g., a transformer-based decoder) that can be employed using the disclosed implementations. Generative language model 100 is an example of a machine learning model that can be used to perform one or more natural language processing tasks that involve generating text, as discussed more below. For the purposes of this document, the term "natural language" means language that is normally used by human beings for writing or conversation. (Radford, et al., "*Improving language understanding by generative pre-training,*" 2018).

Generative language model 100 can receive input text 110, e.g., a prompt from a user. For instance, the input text can include words, sentences, phrases, or other representations of language. The input text can be broken into tokens and mapped to token and position embeddings 101 representing the input text. Token embeddings can be represented in a vector space where semantically-similar and/or syntactically-similar embeddings are relatively close to one another, and less semantically-similar or less syntactically-similar tokens are relatively further apart. Position embeddings represent the location of each token in order relative to the other tokens from the input text.

The token and position embeddings 101 are processed in one or more decoder blocks 112. Each decoder block implements masked multi-head self-attention 103, which is a mechanism relating different positions of tokens within the input text to compute the similarities between those tokens. Each token embedding is represented as a weighted sum of other tokens in the input text. Attention is only applied for already-decoded values, and future values are masked. Layer normalization 104 normalizes features to mean values of 0 and variance to 1, resulting in smooth gradients. Feed forward layer 105 transforms these features into a representation suitable for the next iteration of decoding, after which another layer normalization 106 is applied. Multiple instances of decoder blocks can operate sequentially on input text, with each subsequent decoder block operating on the output of a preceding decoder block. After the final decoding block, text prediction layer 107 can predict the next word in the sequence, which is output as output text 120 in response to the input text 110 and also fed back into the language model. The output text can be a newly-generated response to the prompt provided as input text to the generative language model.

Generative language model 100 can be trained using techniques such as next-token prediction or masked language modeling on a large, diverse corpus of documents. For instance, the text prediction layer 107 can predict the next token in a given document, and parameters of the decoder block 112 and/or text prediction layer can be adjusted when the predicted token is incorrect. In some cases, a generative language model can be pretrained on a large corpus of documents and then tuned to a particular use case. For instance, a pretrained generative language model can be tuned using a reinforcement learning technique such as reinforcement learning from human feedback ("RLHF").

Query Suggestion Example

The following describes a specific example where contextualization is used to augment a query suggestion process so that the generative language model can generate a query suggestion for a user. In the example set forth below, a generative language model generates a query suggestion for a user that is conditioned on linked entities extracted from a search log for the user. However, the techniques described herein can be employed to use entity resource identifiers for contextualization of generative language models for a wide range of tasks.

Figure 2:
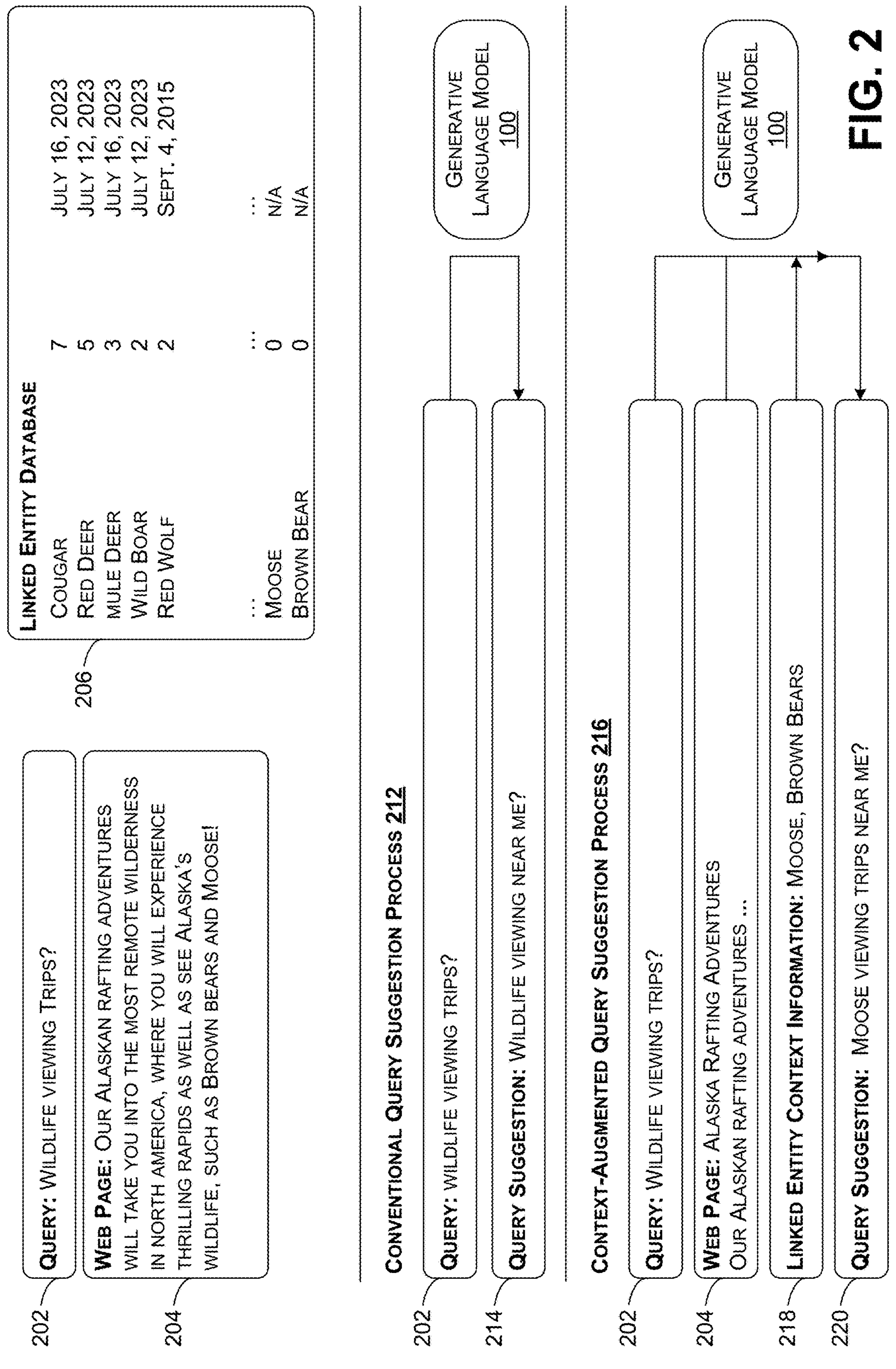
FIG. 2 illustrates an example of a context-augmented query suggestion process using a generative language model, consistent with some implementations of the present concepts.

FIG. 2 shows an example where a user enters a current natural language query 202 while browsing a currently-visited web page 204. The user has an associated linked entity database 206, which identifies entities corresponding to entity resource identifiers extracted by an entity linker from a search log of queries submitted by the user to a search engine and web pages that the user clicked from search results returned by the search engine.

A conventional query suggestion process 212 involves inputting the current natural language query 202 to generative language model 100, which returns a query suggestion 214. Here, query suggestion 214 is a fairly generic alternative to the original query, e.g., rephrasing the original query "Wildlife viewing trips" to "Wildlife viewing near me?," which is a query suggestion that would be appropriate for almost any user.

A context-augmented query suggestion process 216 involves inputting the current query 202 to the generative language model 100 with additional context, such as the currently-visited web page 204 and linked entity context information 218. The linked entity context information 218 can be derived from the linked entity database 206, and can identify a set of one or more entities.

There are various approaches for selecting the set of entities to include in the linked entity context information. For example, some implementations can include entities that are familiar to the user, e.g., frequently and/or recently accessed by the user. This can be useful for conditioning the generative language model to generate responses that reflect the user's current interests. Other implementations can include entities that are not familiar to the user, e.g., entities that the user has not accessed frequently or at all. This can be useful for conditioning the generative language model to expand the user's knowledge by steering them toward entities that they are likely to be interested in but had not previously thought to consider. Further implementations can include entities that have been accessed by the user but not recently, e.g., to refresh the user's memory or to otherwise remind the user of interests that they have. Still further implementations can identify entities that are related to entities that have been accessed by the user and include the related entities in the set of entities to include in the linked entity context information.

The following examples show a scenario where the entities selected for the linked entity context information are relatively unfamiliar to the user. The linked entity database 206 shown in FIG. 2 indicates that the user has accessed a "cougar" entity most frequently (7 times) and has not accessed "moose" or "brown bear" entities at all. The currently-visited web page 204 includes the moose and brown bear entities. By matching the entities in the currently-visited web page to the least-frequently visited entities in the linked entity database, the set of entities "moose" and "brown bear" can be selected for inclusion in linked entity context information. Given these entities, the generative language model can output a contextualized query suggestion "moose viewing trips near me?" that encourages the user to expand their knowledge for entities that are relatively unfamiliar but are still likely to be of current interest to the user, given that they are mentioned in the web page being currently visited by the user.

Populating the Linked Entity Database

Figure 3A:
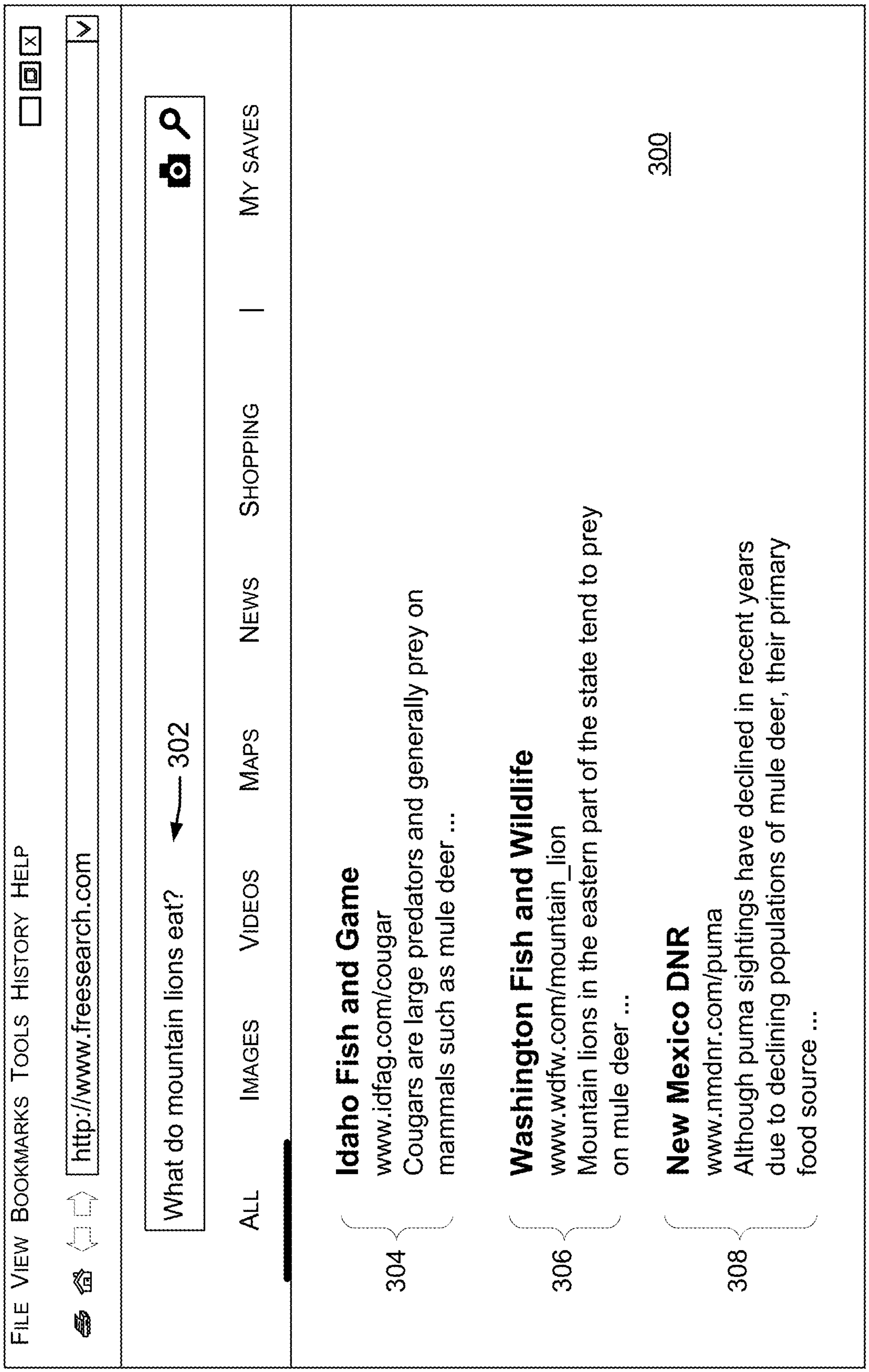
FIG. 3A shows an example of a first browsing session, consistent with some implementations of the present concepts.

FIGS. 3A, 3B, 4A, and 4B collectively show how the linked entity database 206 can be populated from previous search activity by the user. FIG. 3A shows an example of a first browsing session. A user accesses a search engine web page 300 and enters a query 302. They receive search results 304, 306, and 308 from the search engine. For the purposes of example, assume that the user clicks every web page returned in the search results.

Figure 3B:
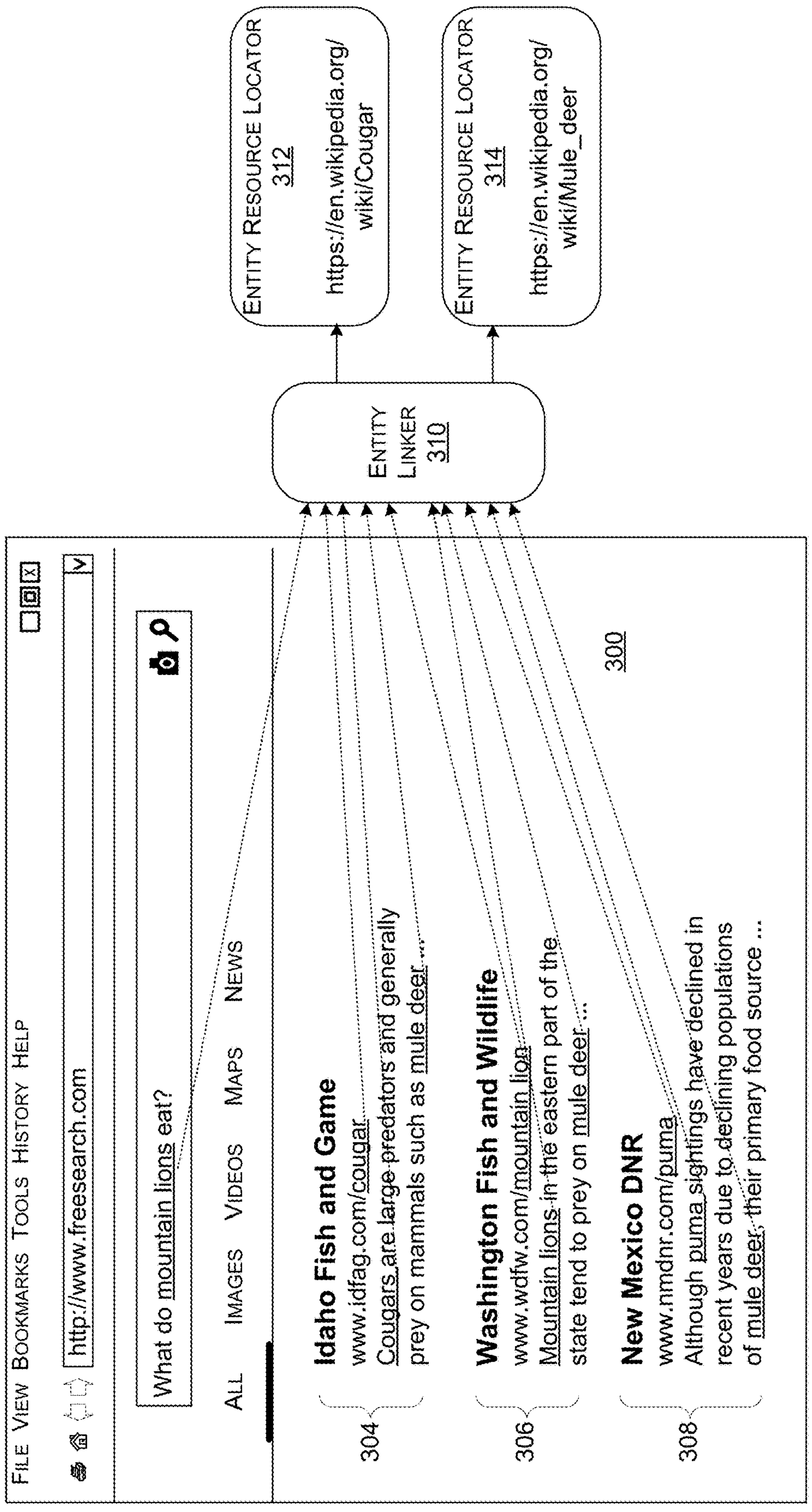
FIG. 3B shows an example of using an entity linker to map strings accessed during the first browsing session into corresponding linked entity resource identifiers, consistent with some implementations of the present concepts.

FIG. 3B shows that entity linker 310 can parse the content of the query and each clicked search result to extract entity mentions from the web pages, underlined in FIG. 3B. For instance, "mountain lions," "cougar," and "puma" all refer to the same entity (a particular species) and "mule deer" refers to another entity. The entity linker can map each entity mention to a uniform resource identifier for that entity. Here, the cougar entity mentions are mapped to linked entity resource locator 312 (e.g., the URL for a Wikipedia page describing cougars) and linked entity resource locator 314 (e.g., the URL for a Wikipedia page describing mule deer). Note that, while other entities are mentioned in the search results (e.g., Idaho, Washington, New Mexico), these entities are not employed in the following examples and are thus not underlined or shown as being linked to a resource locator. In practice, however, all entities in queries and/or web pages can be linked and employed as discussed elsewhere herein.

Figure 4A:
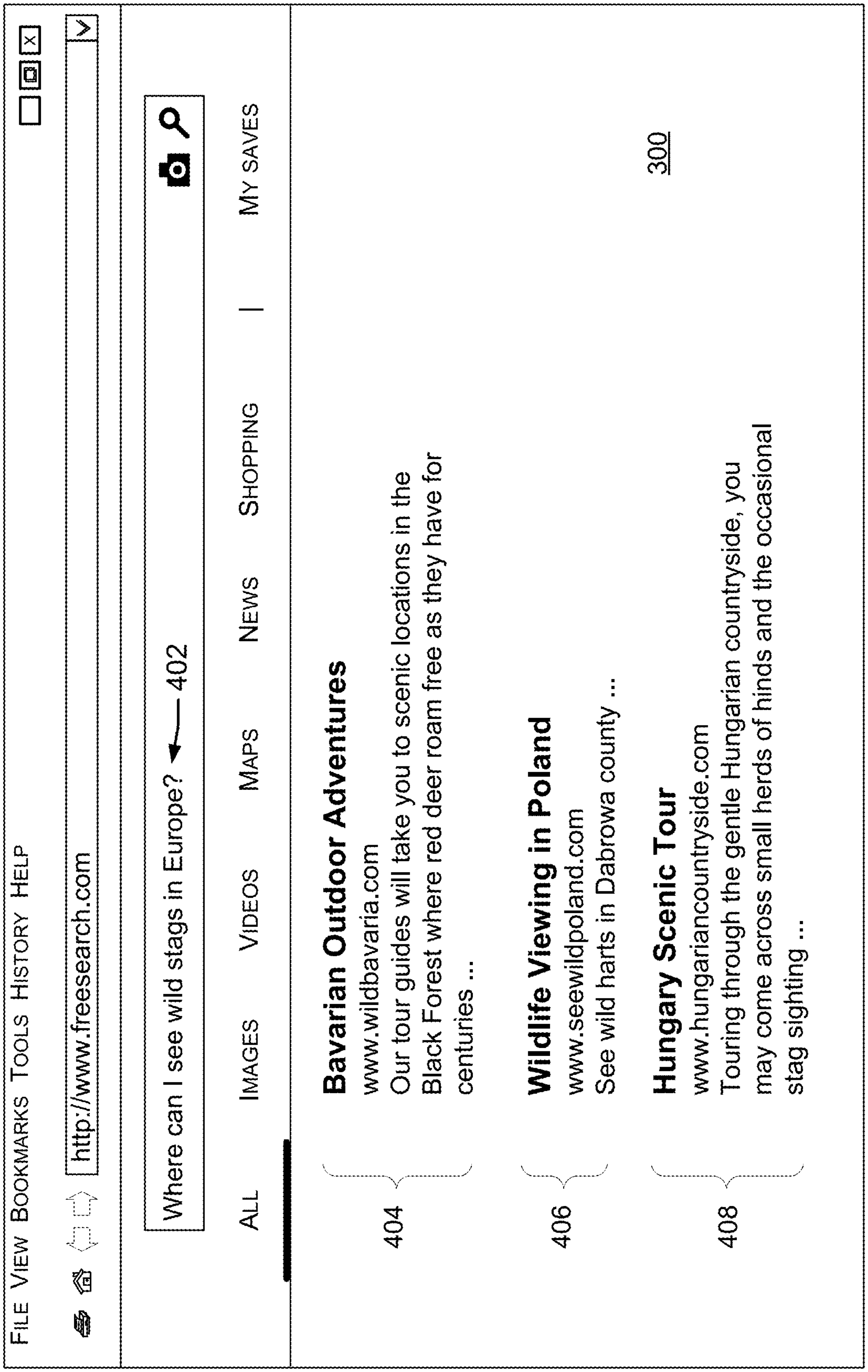
FIG. 4A shows an example of a second browsing session, consistent with some implementations of the present concepts.

FIG. 4A shows an example of a second browsing session. The user accesses search engine web page 300 and enters a query 402. They receive search results 404, 406, and 408 from the search engine. Again, assume that the user clicks every web page returned in the search results.

Figure 4B:
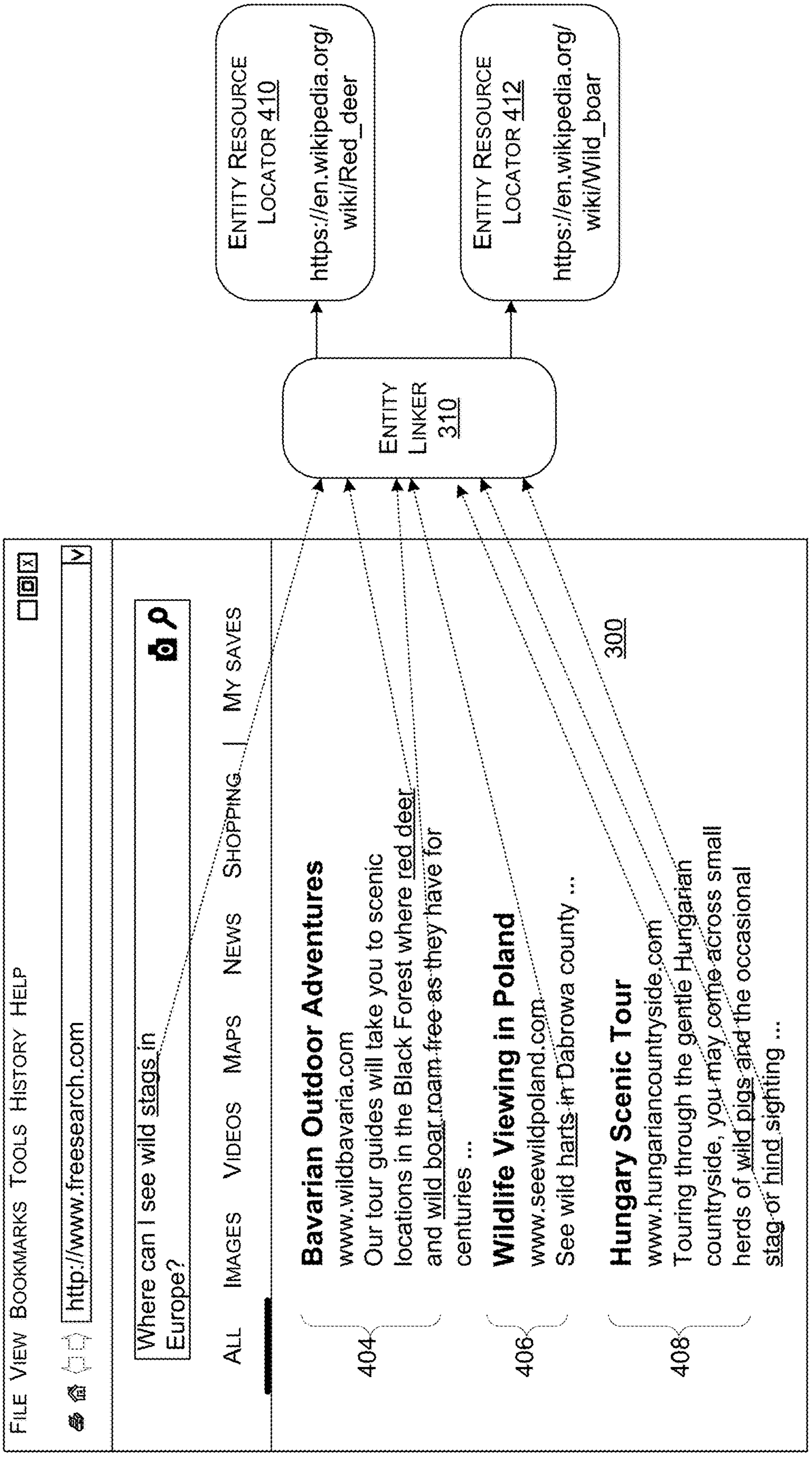
FIG. 4B shows an example of using an entity linker to map strings accessed during the second browsing session into corresponding linked entity resource identifiers, consistent with some implementations of the present concepts.

FIG. 4B shows that entity linker 310 can parse the content of the query 402 and each clicked search result to extract entity mentions from the web pages, underlined in FIG. 4B. For instance, "stags," "red deer," "harts," "stag," and "hind" all refer to the same entity (a particular species) and "wild boar" and "wild pigs" both refer to another entity (another species). The entity linker can map each entity mention to a uniform resource identifier for that entity. Here, the red deer entity mentions are mapped to linked entity resource locator 410 (e.g., the URL for a Wikipedia page describing red deer) and the wild boar entity mentions are mapped to linked entity resource locator 412 (e.g., the URL for a Wikipedia page describing wild boars). Again, while other entities are mentioned in the search results (e.g., Bavaria, Black Forest, Poland, Dabrowa, Hungary), these entities are not employed in the following examples and are thus not underlined or shown as being linked to a resource locator. In practice, however, all entities in queries and/or web pages can be linked and employed as discussed elsewhere herein.

Example Knowledge Graph

Generally speaking, an entity resource identifier can be any identifier that can be used to uniquely identify an entity. One source of entity resource identifiers is a public knowledge graph, such as Wikidata. Wikidata represents individual entities as URLs to Wikipedia entries for those entities. Other examples include Google's knowledge graph, Microsoft's knowledge graph, etc.

Figure 5A:
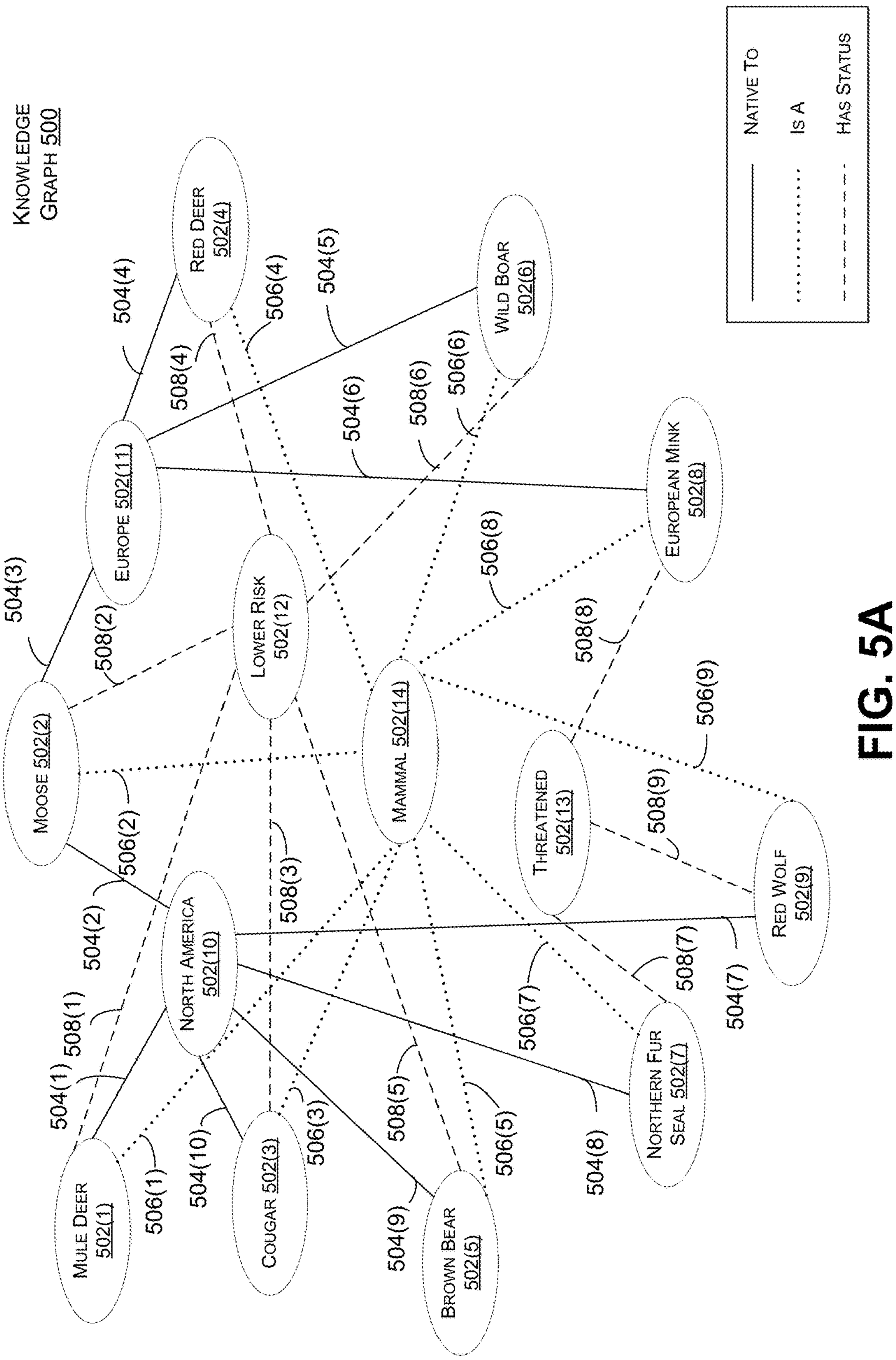
FIG. 5A shows an example of a knowledge graph, consistent with some implementations of the present concepts.

FIG. 5A shows an example knowledge graph 500 mentioning various entities 502. The entities are connected by edges representing relationships, with solid edges 504 representing "native to" relationships, dotted edges 506 representing "is a" relationships, and dashed edges 508 representing "has status" relationships. Each node and edge has a corresponding parenthetical indicating a specific node and/or edge.

Figure 5B:
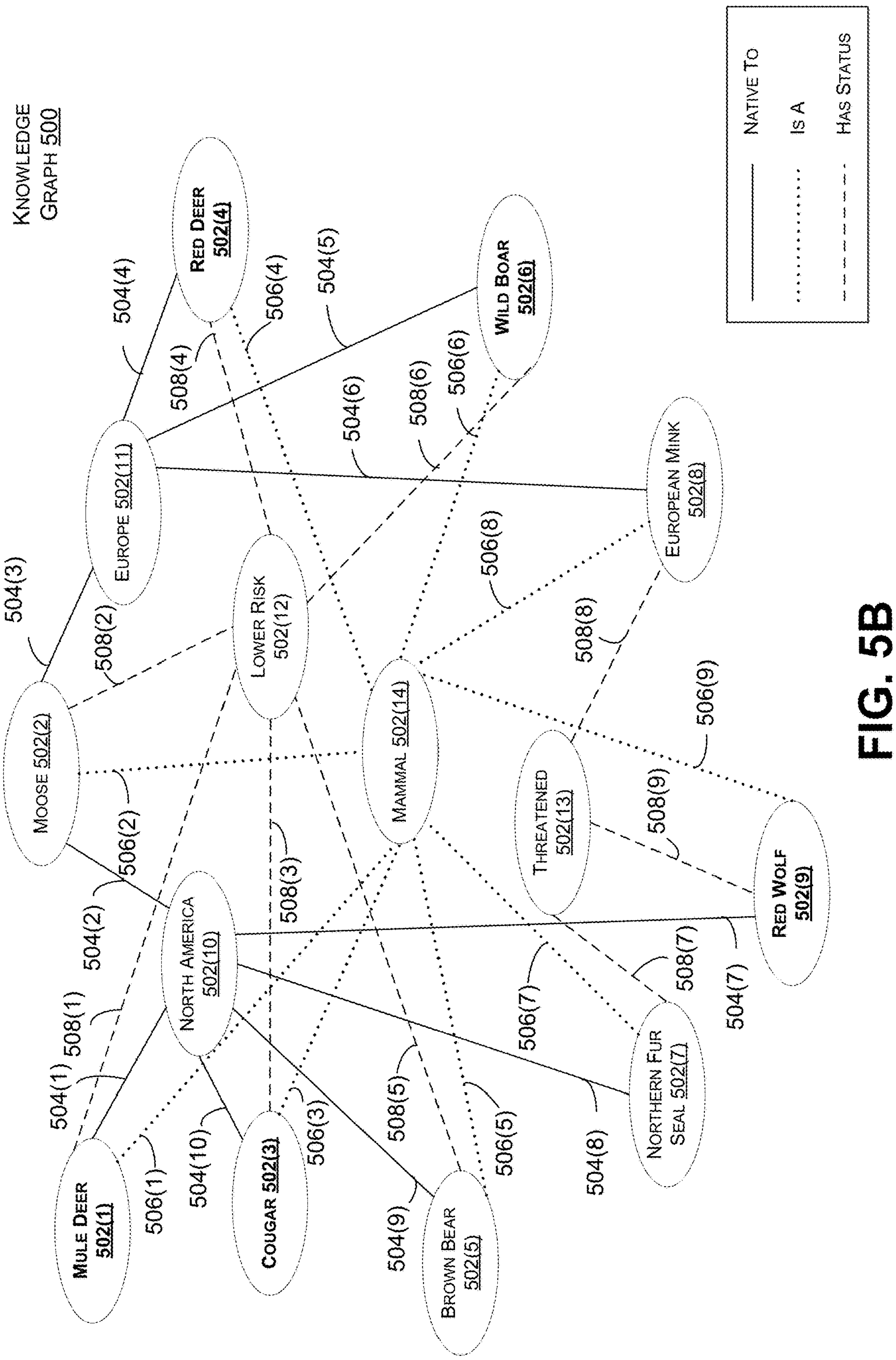
FIG. 5B shows an example of projecting linked entity resource identifiers accessed by a user onto a knowledge graph, consistent with some implementations of the present concepts.

FIG. 5B shows an example projection of the entities accessed by the user onto the knowledge graph 500. Referring back to FIG. 2, linked entity database 206 indicates the user has accessed the cougar, red deer, mule deer, wild boar, and red wolf entities. These entities are shown in bold in FIG. 5B. Thus, the user's knowledge can be represented as a subgraph of knowledge graph 500.

Example Prompt Data Structure

FIG. 6 shows an example contextualized prompt data structure 600 that can be employed to prompt generative language model 100. The contextualized prompt data structure includes an instructions section 602 that instructs the generative language model to suggest a search query for the user, and explains some contextual information that will be used to generate the response. The contextualized prompt data structure also includes a current information section 604, such as the current user query, session information, the title and text of a currently-visited web page article, and personal entities (e.g., linked entity context information) for the user. Response format section 606 specifies the format of a response to the contextualized prompt data structure.

Contextualized prompt data structure 600 can be viewed as having two static sections—instructions section 602 and response format section 606—that are reused across user sessions and for different users. Current information section 604 can be viewed as a dynamically-populated section that changes as the user browses different web pages, or as the linked entity database 206 is updated over time.

Example User Experience

Figure 7:
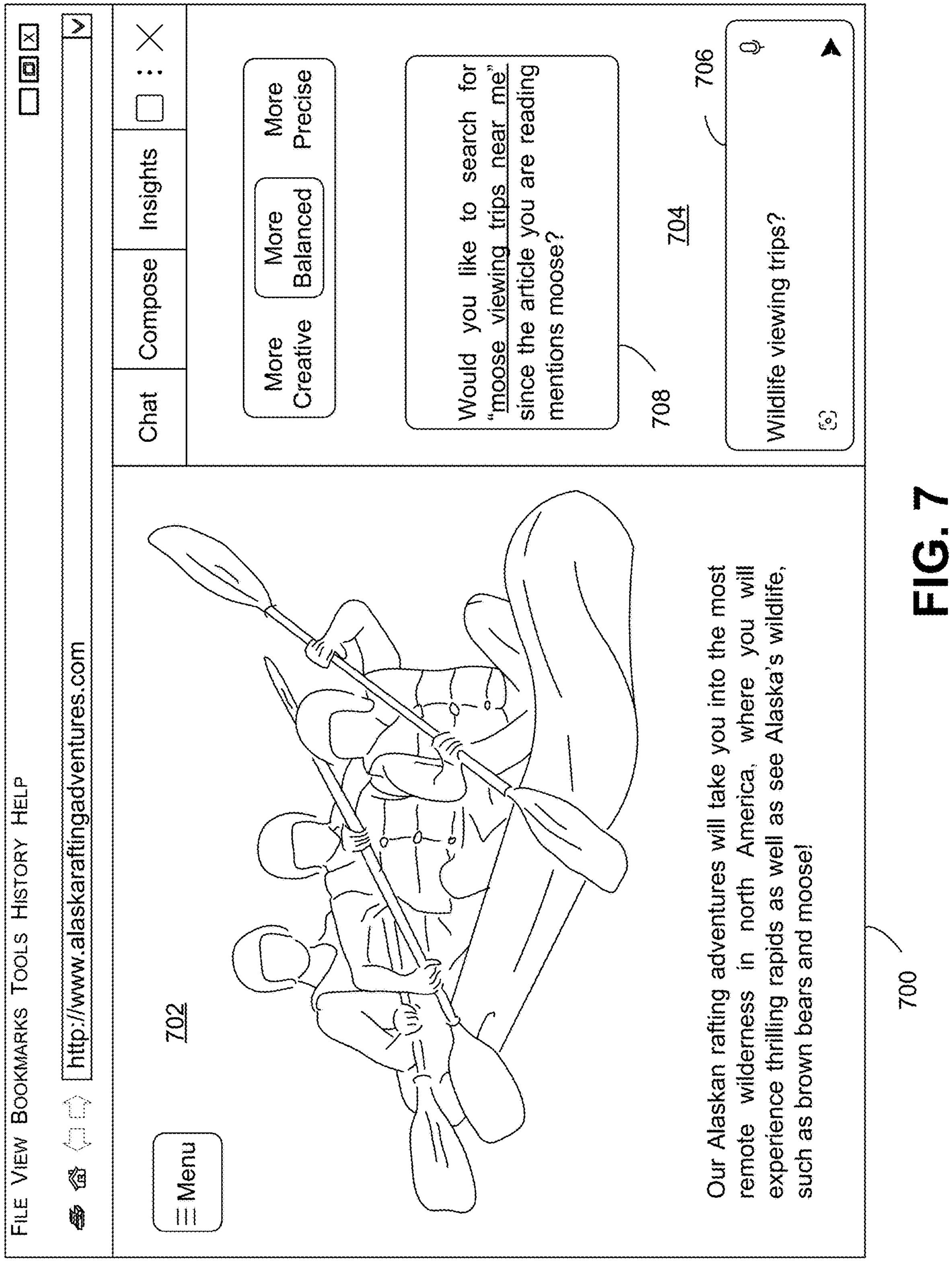
FIG. 7 shows an example user experience, consistent with some implementations of the present concepts.

FIG. 7 shows an example user experience, where a browser window 700 includes a currently-visited web page 702 and a digital assistant interface 704. The user enters a current natural language query "wildlife viewing trips?" into prompt area 706, and the generative language model generates a response in response area 708. The response includes an underlined suggested query, "moose viewing trips near me," which is generated not only based on the current query, but the content of the currently-visited web page as well as linked entity context information identifying "moose" as an entity for conditioning the response. In some implementations, the browser can be configured to automatically submit the suggested query to a search engine when selected by the user.

Specific Implementation

The following section describes a specific implementation of how a prompt data structure for a generative language model can be contextualized based on a set of linked entity resource locators for a given user. A generative language model can be parameterized by a set of parameters θ, and take an input sequence of tokens $x=[x_1, x_2, \ldots, x_n]$ and a supplemental sequence of context tokens $c=[c_1, c_2, \ldots, c_k]$ as a prompt. The generative language model can then generate an output sequence of tokens $y=[y_1, y_2, \ldots, y_m]$. Then, formally, the inference of a generative language model can be summarized as: $y=LLM_\theta(x, c)$. Here, θ can be pre-trained auto-regressively on massive text corpora and remains fixed, x is a task-dependent user issued prompt or set of instructions, and c is some additional context provided by an auxiliary system that helps augment, ground, or otherwise improve the quality of the input, so that the generative language model is able generate outputs y more effectively.

Let $q_j$ be the most recent query issued by a user and $q_h=[q_1, q_2, \ldots, q_{j-1}]$ be a sequence of their historical queries. Then, a query suggestion model QS aims to predict new queries $q_{j+1}$ that an individual user with current query $q_j$ and query history $q_h$ might be likely to find useful. This process can be summarized as follows: $q_{j+1}=QS_\theta(q_j, q_h)$.

This definition can be expanded to incorporate a broader set of context $c=[c_1, c_2, \ldots, c_k]$ linearized as sequences of text. Specifically, assume that x is an input query: $x=q_j$. Then, $q_h \in c$, meaning that the query history is one of the contextual signals capable of being leveraged for query suggestion. In this task, the text of a web-page w currently being consumed by the user is also included in c, as follows: $w \in c$. Formally, this task can be summarized as follows: $q_{j+1}=QS_\theta(x, c)$.

The following describes a solution to the problem of contextual query suggestion by leveraging a knowledge-augmented model to yield more personalized outputs. Formally, for $q_{j+1}=QS_\theta(x, c)$, let QS to be a generative language model (e.g., OpenAI, "*GPT*-4 *Technical Report*," arxiv 2303.08774," 2023) and include aggregated entity-centric knowledge from users' historical interactions in the context c, in order to generate better recommendations $q_{j+1}$, as measured by a set of personalization-focused metrics.

The supplemental context of a generative language model cis provided by auxiliary sources or systems that help enrich the input prompt to the model. These auxiliary sources can include data that captures the personal preferences, interests, and knowledge of individual users. Thus, if K is a knowledge store that encapsulates these user-specific data, and $k \in K$ is a contextually relevant subset linearized as text, then, for the task of contextual query suggestion, the context c can be defined as follows: $c=[q_h \cdot w \cdot A]$, where $[\cdot]$ is the concatenation operation.

The following describes using interaction histories with a search engine to extract user interests, which is an especially relevant source of knowledge for contextual query suggestion, where generating helpful search suggestions from search histories is the eventual goal of the task. Given this source, two distinct instantiations of the knowledge store K can be employed: a first variant that linearly captures historical user queries and browsing patterns ($K_s$), and another leveraging an entity-centric view of users' personal interests and knowledge ($K_e$).

The intuition behind the first knowledge store, $K_s$, is that users issue queries and click on web-pages that they are interested in or care about. And, when accumulated over time, these also start to construct a picture of what users know and how deeply do they know them. For example, a user that issues multiple queries over time including "Machine Learning," "ML," "Optimization," "SGD," "Deep Learning" and clicks a number of web-pages resulting from these queries can assumed to be at least familiar with the general concept of "Machine Learning."

In order to operationalize this intuition, a timestamped memory stream can be constructed to include the queries issued by users and the web-pages associated with the results they clicked on. Note that this is an extremely light-weight instantiation of the knowledge store, being only a partial view of user actions and interactions already logged by modern web-scale search engines. As a result, there are no privacy or scalability concerns beyond those already inherent in the search engine's logging system.

Building a memory stream over users' search histories has a few limitations that stem from its design. Firstly, because search queries and web-page visitations are stored and retrieved linearly, it is difficult to perform aggregations on the fly. Yet, such aggregation can be greatly beneficial for personalization. For example, knowing that a user clicked on web-pages associated with "Machine Learning" multiple times, while only clicking on a single web-page stemming from the query "Computational Biology" would tend to indicate a greater affinity for and knowledge of machine learning. Other issues include the fact that individual web pages visited by a user may contain mixtures of several different topics and domains, distracting generative language models in generating outputs consistent to context, and the fact that including large amounts of text from lengthy web-pages renders generative language model usage slow and expensive.

In order to address these concerns, an entity-centric instance of the knowledge store $K_e$ can be created, as described above with respect to linked entity database 206. Entities are useful atoms for capturing the interests and knowledge of users because they consist of the nouns (proper or otherwise) that describe the people, places, organizations, topics and domains that the users care and know about. Additionally, because they tend to be relatively short and easy to aggregate, and because entity recognition and linking are well-studied problems, the process of operationalizing the creation of this store is greatly simplified.

One entity linker that can be employed is Cucerzan, Silviu, "*MSR System for Entity Linking at TAC* 2012", TAC 2012. Such an entity linker can tag and canonicalize the entities that appear in the search queries and associated web-pages visited by users. While individual occurrences of entities in the knowledge store are timestamped, additional aggregation can be done by counting the number of occurrences of entities in the search log for a given user.

Note that this entity-centric knowledge store instantiation is relatively light-weight when compared with systems that personalize through the construction of deep profiles. The only external dependency is the entity linker, which can process thousands of tokens per second. In addition, scalability and privacy concerns are also small, since entity linking projects onto sub-graphs of public entity graphs (e.g. Wikipedia), subsequently records can be easily removed upon request by eliminating associated entities from the store, and further aggregation of entity occurrences lends itself naturally to common privacy mitigation practices such as k-anonymization.

Next, consider retrieving contextually relevant items k from a knowledge-store K, conditioned on the input query $q_j$ and web document w that the user is currently interacting with. A carefully considered retrieval step is essential in augmenting the capability of a generative language model to produce personalized outputs, since it grounds generation to historical interests and knowledge of users. The following demonstrates how retrieval can be performed for both instantiations of the knowledge store, $K_s$ and $K_e$.

In the case of $K_s$ over users' search and browsing history, retrieval can be done by finding and returning the most similar queries and previously visited web-pages to the current input x. In practice, the queries can then be elided from this result since they yield little benefit over the much longer text present in web-pages. To operationalize the retrieval step, first all records in the knowledge-store $K_s$ can be represented using embeddings, then embedding-level similarities with the representation of current query $q_j$ can be computed. One way to compute embedding similarities is described at Contriever (Lei, et al. "*Unsupervised Dense Retrieval with Relevance-Aware Contrastive Pre-Training*," arXiv preprint arXiv:2306.03166 (2023)). The most similar records k can be returned.

Meanwhile, for the entity-centric knowledge store $K_e$, retrieval can be conditioned on the entities present in the current query $q_j$ and the web-page w, which are further matched against $K_e$. Given that entities are atomic units with associated counts and time-stamps, the matching and retrieval process can be operationalized in flexible ways. As noted, various strategies exist for identifying entities to include in entity context information of a prompt. Types of entities include familiar entities (entities the user has frequently encountered), unfamiliar entities (entities the user has encountered infrequently or not at all), and lapsed entities (entities that the user used to encounter previously but hasn't done so more recently). Specifically, familiar entities can be identified by the entities appearing in the search context [x·w] by frequency of occurrence in the knowledge store $K_e$, then sampling a specified number (e.g., 5) of entities proportionally to their frequency. For unfamiliar entities, a similar process can be used for sampling, except that entities can be sorted inversely with respect to their occurrence in $K_e$. Finally, for lapsed entities, start by filtering entities in [x·w] by time-stamp to retain only those that occur in $K_e$, but haven't been engaged within a specified time period (e.g., the preceding two week). Then sample from this filtered set of entities by frequency, as discussed above regarding familiar entities.

Experimental Results

The techniques described above were evaluated using real search logs from a large-scale web search engine. Three months of search logs were obtained, and then filtered and sampled as follows. First, because the task being evaluated is contextual query suggestion—i.e., recommendations are predicated on a current web-page the user is viewing—sessions that do not contain any clicked search results were filtered out. Then, the search logs were filtered to discard click events that lead to pages in domains other than Wikipedia or a curated set of 500 high-traffic news publishers. This was done because the entity linker employed maps onto Wikipedia, and to increase the chances of encountering linked entities. It is worth noting that the framework described herein is agnostic to the choice of entity linker or its underlying knowledge graph, and the disclosed techniques could readily be applied to a different domain, for example, using an entity linker over a product graph for shopping. The remaining data was filtered to discard users who infrequent visitors that had fewer than 100 page visitations for three months. In addition, privacy checks and filters were employed, e.g., using search queries requested from at least 50 individuals, to ensure that the data remains suitably anonymized.

The resulting filtered search logs were still very large, so a subset of 1,000 users was sampled in order to get the benchmark set that forms the basis for the evaluations described herein. This final dataset contains, on average, 493 queries, 109 sessions, 177 clicked articles, and 3,053 encountered entities per user. For testing, the dataset was split to reserve the most recent 10 sessions of every user as prediction targets for contextual query suggestions and use all the earlier sessions for building search-and-browsing based ($K_s$) and entity-centric ($K_e$) personal knowledge stores for users as discussed above.

The techniques described herein for knowledge-augmented generative language models were compared against several relevant baselines that make query suggestions based on the search context of users. For comparison, all baselines and the disclosed techniques used GPT to make query suggestions. The evaluated models are listed as follows: (1) Query Suggestion—which uses a current query $q_j$ and historical queries from $q_h$ in the same session to suggest the next query $q_{j+1}$, (2) Contextual Query Suggestion—which is similar to Query Suggestion, but additionally conditions the recommendation of the next query $q_{j+1}$, on a web-page w, clicked as a result of current query $q_j$, (3) Contextual Query Suggestion w/$K_s$—which includes retrievals from the knowledge store $K_s$ over users' historical search and browsing activities, as additional context to personalize the outputs of the generative language model, and (4) K-LaMP—a model that implements the techniques described above by augmenting generative language models with linked entity context information derived from the knowledge store $K_e$ in order to perform contextual query suggestion.

To perform the evaluations described herein, human evaluators were shown the current and previous search queries of a user in a given session, the web page the user clicked on after issuing the current search query, and a list of 20 trending entities which capture statistical surges in search volume across users. Additionally, in order to present an encapsulation of the personal interests and knowledge of users, the evaluators were shown a list of the 30 most frequent entities from the user's personal entity-centric knowledge store, as well as a GPT-4 generated summary from these entities that states what topics or domains the user may know or care about much.

Presented with these data and recommended queries from the different baselines and K-LaMP (where their names are obscured to annotators), a human judge was asked to evaluate the following three metrics on a 3-point Likert scale: (1) Validity—whether an output query can be input into a search engine and be expected to yield relevant results; (2) Relatedness—whether the output query closely relates to the user's personal interests and knowledge; and (3) Usefulness—whether the user is likely to click on the output query, given their historical interests and knowledge as well as their current search context. Finally, the annotators were asked for a fourth measure: (4) Ranking—where the outputs of the different systems are ranked according to the order in which they are likely to be clicked, based on their affinity to the user's interests, knowledge, and search context. Collectively, these four evaluation metrics capture not only how good the different query suggestions are, —both individually and in relation to one another—but also how well they align with the personal aspects of the evaluation task, namely, what users care about and know.

Table 1 shows experimental results:

| Types | Models | Validness (↑) | Relatedness (↑) | Usefulness (↑) | Ranking (↓) |
|---|---|---|---|---|---|
| Baselines | Query Suggestion | 1.769 | 0.962 | 0.948 | 2.736 |
| | Contextual Query Suggestion | 1.966 | 1.267 | 1.245 | 2.415 |
| | Contextual Query Suggestion w/$K_s$ | 1.822 | 1.192 | 1.166 | 2.654 |
| Ours | K-LaMP (Ours) | 1.966 | 1.482 | 1.455 | 2.160 |

confirming that the K-LaMP framework consistently and significantly outperforms all other baselines across Relatedness, Usefulness, and Ranking metrics. While it ties Contextual Query Suggestion on the Validity metric, this finding is overall a positive and not an unexpected one—since intuitively, inclusion of personal context does not necessarily lead to queries that are more valid for search engine retrieval. Meanwhile, there are a few other interesting insights that can be gleaned from this table. Interestingly, Contextual Query Suggestion with $K_s$ does not outperform Contextual Query Suggestion. This could be because the information retrieved from the memory store ($K_s$) has poor relevance to the current search context, leading to spurious augmentation that distracts rather than helps the generative language model.

To investigate this hypothesis further, an auxiliary evaluation asked human annotators to rate the information retrieved from knowledge stores for a particular search context. Retrieval Relevance from both instantiations of the knowledge stores is reported in Table 2:

| Retrieval | Types | Retrieval Relevance (↑) |
|---|---|---|
| History-Based Retrieval ($K_s$) | Past Documents | 0.299 |
| Entity-centric Retrieval ($K_e$) | Familiar Entities | 0.936 |
| | Unfamiliar Entities | 0.810 |
| | Lapsed Entities | 0.849 |

This metric is the average score from a Yes/No question—whether the retrieved context is relevant to the current search context (1) or not (0). As shown in Table 2, the quality of retrievals from the entity-centric knowledge store are significantly better than those from the linear search history-based store. The entity-based knowledge store provides far greater control with entities being the atomic units of the knowledge representation space, and allows exactly matching entities in the current context against entities in the store, rather than rely on a similarity-based retrieval process with the Contriever implementation.

Example System

Figure 8:
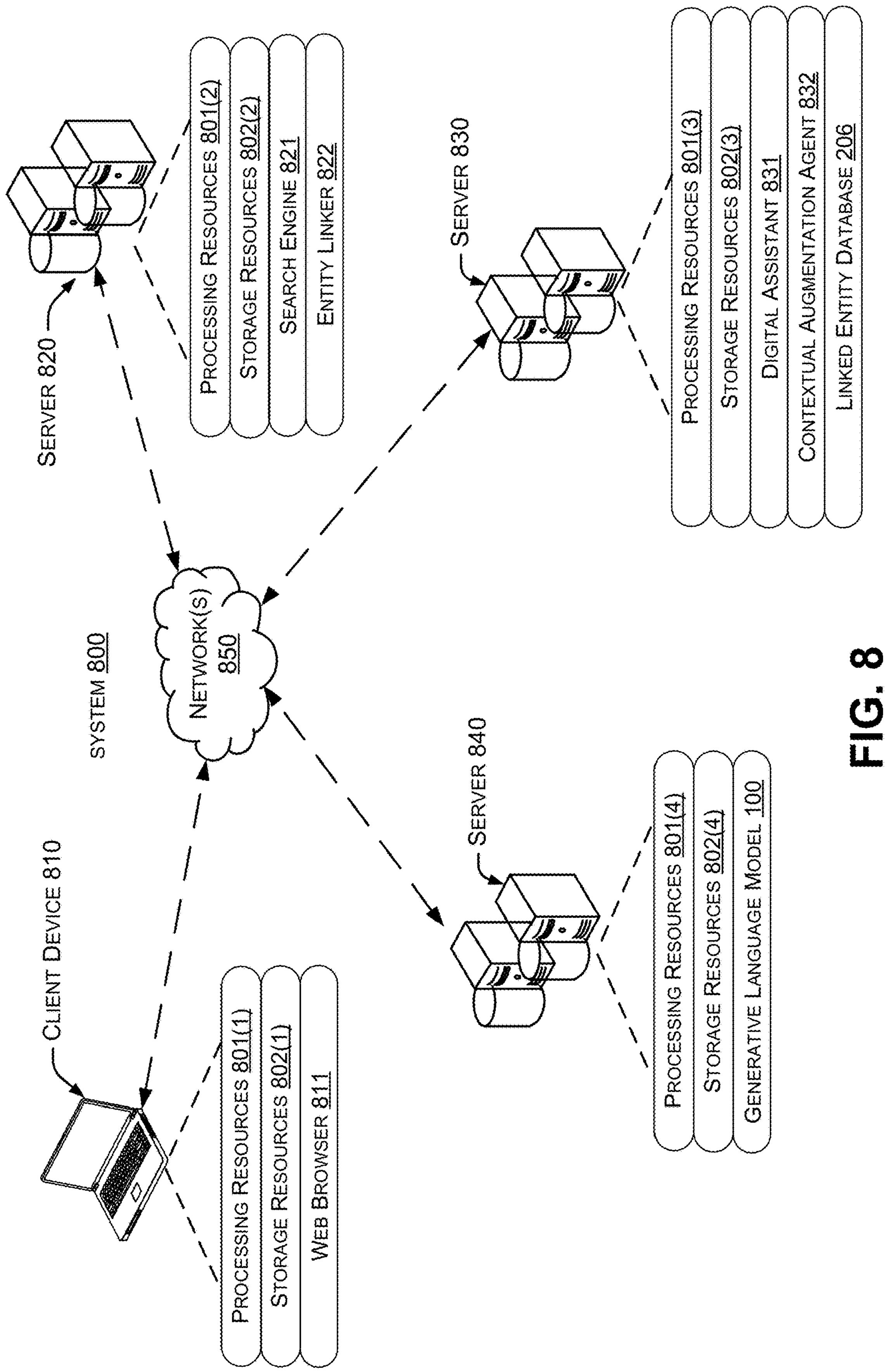
FIG. 8 illustrates an example system, consistent with some implementations of the present concepts.

The present implementations can be performed in various scenarios on various devices. FIG. 8 shows an example system 800 in which the present implementations can be employed, as discussed more below.

As shown in FIG. 8, system 800 includes a client device 810, a server 820, a server 830, and a server 840, connected by one or more network(s) 850. Note that the client device can be embodied as a mobile device such as a smart phone or tablet, as well as a stationary device such as a desktop, server device, etc. Likewise, the servers can be implemented using various types of computing devices. In some cases, any of the devices shown in FIG. 8, but particularly the servers, can be implemented in data centers, server farms, etc.

Certain components of the devices shown in FIG. 8 may be referred to herein by parenthetical reference numbers. For the purposes of the following description, the parenthetical (1) indicates an occurrence of a given component on client device 810, (2) indicates an occurrence of a given component on server 820, (3) indicates an occurrence on server 830, and (4) indicates an occurrence on server 840. Unless identifying a specific instance of a given component, this document will refer generally to the components without the parenthetical.

Generally, the devices 810, 820, 830, and/or 840 may have respective processing resources 801 and storage resources 802, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 810 can include a web browser 811 that can interact with a search engine 821 on server 820. The user can submit queries to the search engine, receive search results from the search engine, and select individual results to open in the web browser. The client device can also interact with digital assistant 831 on server 830.

The digital assistant 831 on server 830 can employ contextual augmentation agent 832 to interact with generative language model 100 on server 840. The contextual augmentation agent can receive entity resource identifiers from entity linker 822 on server 820. For instance, the entity linker can identify references to entities in the queries or search results and tag each entity, e.g., using a URI that maps to a web page representing that entity. The contextual augmentation agent can populate linked entity database 206 based on the received entity resource identifiers. Then, the contextual augmentation agent can generate contextualized prompt data structures as described previously. The digital assistant can provide the contextualized prompt data structures to the generative language model 100 on server 840, which then generates responses to user queries conditioned on the linked entity context information present in the contextualized prompt data structures. The generated responses can be provided to the user by the digital assistant. In the case of a query suggestion, the query can automatically be sent to search engine 821 by the digital assistant, if the user selects the query suggestion (e.g., by clicking on the query suggestion).

Example Method

Figure 9:
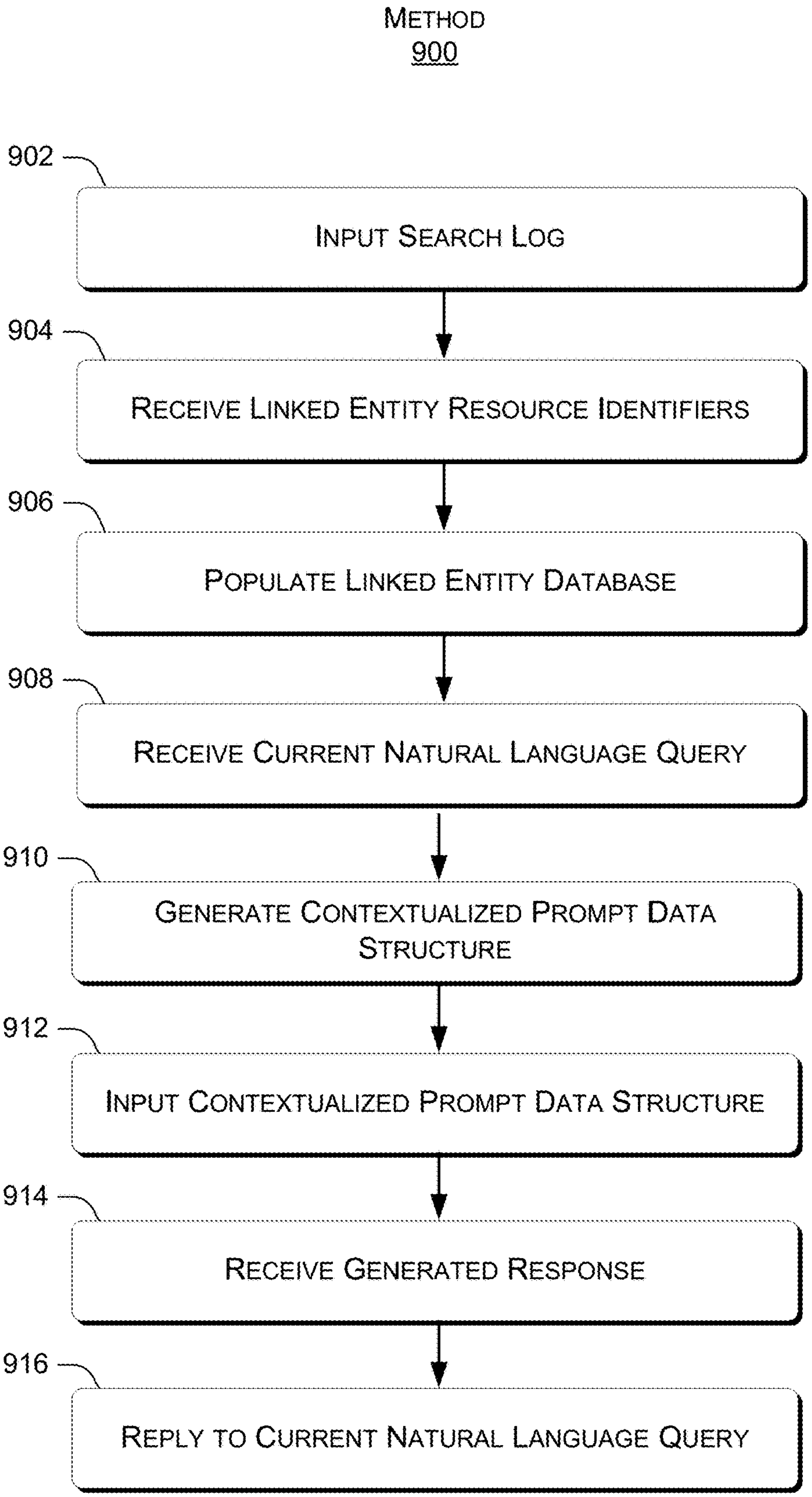
FIG. 9 illustrates a flow chart of an example method or technique, consistent with some implementations of the present concepts.

FIG. 9 illustrates an example method 900, consistent with the present concepts. As discussed more below, method 900 can be implemented on many different types of devices, e.g., by one or more cloud servers, by a client device such as a laptop, tablet, or smartphone, or by combinations of one or more servers, client devices, etc.

Method 900 begins at block 902, where a search log is input to an entity linker. For instance, the search log can include web search queries submitted by a user to obtain web search results from a search engine and clicked web pages selected by the user from the web search results.

Method 900 continues at block 904, where first linked entity resource identifiers are received from the entity linker. For instance, the first linked entity identifiers can be URLs or other unique identifiers of entities extracted from the search log by the entity linker. In some cases, the entity linker can employ unsupervised learning (e.g., clustering) and/or supervised learning (e.g., neural network or SVM classifiers) techniques to tag individual strings in the search log with respective entity resource identifiers.

Method 900 continues at block 906, where a linked entity database is populated with the first linked entity resource identifiers received from the entity linker. For instance, the linked entity database can be a relational database, object-oriented database, comma-separated value database, a spreadsheet, etc. The linked entity database can also include one or more fields indicating how frequently each entity resource identifier was accessed in the search log, e.g., aggregate numbers of occurrences of each entity resource identifier.

Method 900 continues at block 908, where a current natural language query is received from the user. Although search queries were employed in the examples described above, the current natural language query can be any query requesting a response for the user.

Method 900 continues at block 910, where a contextualized prompt data structure is generated. The contextualized prompt data structure can include the current natural language query as well as additional context information, such as the title or text of a currently-visited web page, as well as linked entity context information derived from the linked entity database. For instance, the linked entity context information can identify or more of familiar entities, unfamiliar entities, lapsed entities, and/or related entities. Familiar entities can be entities that occur frequently in the personal knowledge store. Unfamiliar entities can be entities that are not present, or occur infrequently, in the personal knowledge store. Lapsed entities can be entities that occur in the personal knowledge store but not within some threshold period of time. Related entities can be identified by traversing a knowledge graph along a path connecting an entity that the user has accessed to identify a related entity.

Method 900 continues at block 912, where the contextualized prompt data structure is input to the generative language model. The linked entity context information can act as a few-shot prompt that conditions the generative language model to generate a response that is conditioned based on the user's previous search activity, e.g., via in-context learning. The generative language model can also be conditioned on text from a currently-visited webpage or other documents being currently accessed by the user.

Method 900 continues at block 914, where a response is received from the generative language model. In some cases, the response is a natural language response, such as a suggested query.

Method 900 continues at block 916, where a reply is provided to the user input. For instance, the reply can include, or be based on, the response to the personalized prompt generated by the generative language model.

In some cases, method 900 can be employed with other types of models, e.g., generative models that produce images, video, and/or audio output. In such implementations, the response generated by the model can include images, video, and/or audio that are generated by the model based on personalized prompt.

Additional Implementations

The description above used query suggestion as an example of how entity resource identifiers could be employed to contextualize a prompt for a generative language model. However, query suggestion is just one task that can be contextualized using the techniques described herein. For instance, a generative language model could be employed to generate other types of content, such as a summary of a web page, word processing document, an email, or a meeting transcript in a manner that is contextualized for the user. Thus, for instance, consider a web page describing rafting trips with scenic views of Alaska and also wildlife viewing opportunities. A generative language model could generate a summary focused on the scenic views for a user that has a linked entity database indicating a strong interest in scenery (e.g., entities such as waterfalls or mountains) and a different summary focused on the wildlife viewing opportunities for another user with a linked entity database indicating a strong interest in wildlife.

Furthermore, the previous examples showed using a currently-visited web page as a type of context information that could be used to condition a prompt, e.g., by matching entities from the currently-visited web page to the linked entity database and selecting from those entities when generating the linked entity context information. However, as also noted above, some implementations can traverse a knowledge graph to identify entities that are related to entities that have been accessed by the user. For instance, referring back to FIG. 5B, consider a path from red wolf 502(9) to northern fur seal 502(7), e.g., along edges 508(9) and 508(7). Here, the user's interaction with the red wolf entity may suggest a general interest in threatened species. By traversing the knowledge graph 500 in this manner, the northern fur seal can be identified as an entity that is conceptually related to the red wolf because they both share a threatened status. In this way, the user's interest in the red wolf can be generalized to explore new areas of the knowledge graph that are in proximity to the user's known interests but that are not necessarily present in a search log for the user.

Furthermore, search logs are but one source of data for identifying entities of interest to a user. Other implementations can identify entities in documents authored by a user, emails received by a user, social media activity, meeting transcripts, etc. In addition, while the techniques described above focus on a generative language model that generates text responses to a user, the techniques described herein can be extended to other types of generative models. For instance, consider a generative image model such as Stable Diffusion or DALL-E, which can process both image or text inputs to generate images. The techniques described herein can be used to contextualize prompts for generative image models or other multimodal models.

Technical Effect

As noted previously, it is possible to train or tune generative language models for specific tasks. However, it is not technically feasible to train or tune a large generative language model for a specific user, because there generally is not sufficient training data available for one user. Furthermore, given the size of a generative language model, it would be technically infeasible to utilize processing, memory, storage, and/or network resources to tune a generative language model for each individual user. In addition, it is not feasible to have separate model instances for each individual user, e.g., a server cannot realistically host different instances of a large generative language model for each prospective user.

While contextualized prompting can be employed to condition a model for a given user, prior approaches have several drawbacks. First, generative language models typically have a limited contextual memory. For instance, generative models often have input character limits, e.g., some generative models are limited to 4 k, 8 k, 32 k, or 64 k input characters. Thus, it is not generally feasible to input a user's entire search log into a generative language model to condition the model for that user.

By using a limited amount of linked entity context information to contextualize a prompt, a great deal of information can be compactly represented for the generative language model. In other words, by distilling a user's previous search and browsing behavior into a limited set of entities, it is possible to fit the additional context information within the contextual memory limit of the generative model. In this manner, the generative language model can be conditioned for the user without fully retraining or retuning the model, while adequately representing the user's interests within the memory constraints of the model.

Device Implementations

As noted above with respect to FIG. 8, system 800 includes several devices, including a client device 810, a server 820, a server 830, and a server 840. As also noted, not all device implementations can be illustrated, and other device implementations should be apparent to the skilled artisan from the description above and below.

The term "device," "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. Processors and storage can be implemented as separate components or integrated together as in computational RAM. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 850. Without limitation, network(s) 850 can include one or more local area networks (LANs), wide area networks (WANs), the Internet, and the like.

Various examples are described above. Additional examples are described below. One example includes a computer-implemented method comprising inputting a search log to an entity linker, the search log including web search queries submitted by a user to obtain web search results from a search engine and clicked web pages selected by the user from the web search results, receiving, from the entity linker, first linked entity resource identifiers of first linked entities identified by the entity linker by processing the search log, populating a linked entity database with the first linked entity resource identifiers received from the entity linker, receiving a current natural language query from the user, generating a contextualized prompt data structure that is based at least on the current natural language query and linked entity context information derived from the linked entity database, inputting the contextualized prompt data structure to a generative language model, receiving a response to the contextualized prompt data structure generated by the generative language model, wherein the response is conditioned on the linked entity context information, and replying to the current natural language query based at least on the response.

Another example can include any of the above and/or below examples where the generative language model comprises a decoder.

Another example can include any of the above and/or below examples where the decoder is a transformer-based decoder including an attention layer.

Another example can include any of the above and/or below examples where the first linked entity resource identifiers correspond to uniform resource identifiers of a public knowledge graph.

Another example can include any of the above and/or below examples where the method further comprises inputting at least one of the current natural language query or a currently-visited web page to the entity linker to obtain second linked entity resource identifiers associated with a current user context of the user, and matching the second linked entity resource identifiers to the first linked entity resource identifiers to determine a set of entities to include in the linked entity context information.

Another example can include any of the above and/or below examples where the method further comprises inputting both the current natural language query and the currently-visited web page to the entity linker to obtain the second linked entity resource identifiers.

Another example can include any of the above and/or below examples where the method further comprises populating the linked entity database with aggregate numbers of occurrences in the search log for each of the first linked entity resource identifiers, and selecting the set of entities to include in the linked entity context information based at least on the aggregate numbers of occurrences.

Another example can include any of the above and/or below examples where the set of entities is selected by sampling from the second linked entity resource identifiers in proportion to the aggregate numbers of occurrences of the second linked entity resource identifiers in the search log.

Another example can include any of the above and/or below examples where the set of entities is selected by filtering the second linked entity resource identifiers to remove recently-accessed second linked entity resource identifiers that have been accessed within a specified time period, and sampling from the filtered second linked entity resource identifiers proportionally to the aggregate numbers of occurrences of the second linked entity resource identifiers in the search log.

Another example can include any of the above and/or below examples where the set of entities is selected by sampling from the second linked entity resource identifiers in inverse proportion to the aggregate numbers of occurrences of the second linked entity resource identifiers in the search log.

Another example can include any of the above and/or below examples where the method further comprises traversing the public knowledge graph along a path from a particular first linked entity resource identifier to identify a related entity resource identifier of a related entity, and including the related entity in the set of entities of the linked entity context information.

Another example can include a system comprising a linked entity database storing first linked entity resource identifiers of linked entities identified by an entity linker by processing a search log for a user, a hardware processing unit; and a storage resource storing computer-readable instructions which, when executed by the hardware processing unit, cause the system to receive a current natural language query from the user, generate a contextualized prompt data structure that includes at least the current natural language query and linked entity context information derived from the linked entity database, input the contextualized prompt data structure to a generative language model, receive a response to the current natural language query generated by the generative language model, wherein the response is conditioned on the linked entity context information included in the contextualized prompt data structure, and reply to the current natural language query based at least on the response.

Another example can include any of the above and/or below examples where the computer-readable instructions, when executed by the hardware processing unit, cause the system to generate the contextualized prompt data structure from a prompt data structure template having a static section instructing the generative language model to provide the response in a specified format and a dynamic section populated based on the current natural language query and the linked entity context information.

Another example can include any of the above and/or below examples where the computer-readable instructions, when executed by the hardware processing unit, cause the system to populate the dynamic section with at least one field from a currently-visited web page.

Another example can include any of the above and/or below examples where the at least one field being a title of the currently-visited web page or main content of the currently-visited web page.

Another example can include any of the above and/or below examples where the linked entity database includes other first linked entity resource identifiers identified by the entity linker from one or more of word processing documents, emails, or meeting transcripts.

Another example can include any of the above and/or below examples where the current natural language query is a current search query, the contextualized prompt data structure requests the generative language model to generate a suggested search query given the current search query and the linked entity context information, and the response includes the suggested search query.

Another example can include any of the above and/or below examples where the response comprises a summary of a web page, a word processing document, an email, or a meeting transcript, or a new email or new word processing document authored for the user by the generative language model.

Another example can include a computer-readable storage medium storing computer-readable instructions which, when executed by a processing unit, cause the processing unit to perform acts comprising receiving a current natural language query from a user, accessing a linked entity database storing first linked entity resource identifiers of linked entities identified by an entity linker by processing a search log for the user, generating a contextualized prompt data structure that includes at least on the current natural language query and linked entity context information derived from the linked entity database, inputting the contextualized prompt to a generative machine learning model, receiving a response to the contextualized prompt generated by the generative machine learning model, wherein the response is conditioned on the linked entity context information, and replying to the current natural language query based at least on the response.

Another example can include any of the above and/or below examples where the response includes at least one of natural language or an image generated by the generative machine learning model.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A computer-implemented method comprising:

inputting a search log to an entity linker, the search log including web search queries submitted by a particular user to obtain web search results from a search engine and clicked web pages selected by the particular user from the web search results;

receiving, from the entity linker, first linked entity resource identifiers of first linked entities identified by the entity linker by processing the search log;

populating a linked entity database with the first linked entity resource identifiers received from the entity linker;

receiving a current natural language query from the particular user;

generating a contextualized prompt data structure based at least on the current natural language query, the contextualized prompt data structure being personalized for the particular user based at least on linked entity context information derived from the linked entity database;

inputting the contextualized prompt data structure to a generative language model;

receiving a response to the contextualized prompt data structure generated by the generative language model, wherein the response is conditioned on the linked entity context information; and replying to the current natural language query based at least on the response.

2. The computer-implemented method of claim 1, wherein the generative language model comprises a decoder.

3. The computer-implemented method of claim 2, wherein the decoder is a transformer-based decoder including an attention layer.

4. The computer-implemented method of claim 3, wherein the first linked entity resource identifiers correspond to uniform resource identifiers of a public knowledge graph.

5. The computer-implemented method of claim 4, further comprising:

inputting at least one of the current natural language query or a currently-visited web page to the entity linker to obtain second linked entity resource identifiers associated with a current user context of the particular user; and matching the second linked entity resource identifiers to the first linked entity resource identifiers to determine a set of entities to include in the linked entity context information.

6. The computer-implemented method of claim 5, further comprising:

inputting both the current natural language query and the currently-visited web page to the entity linker to obtain the second linked entity resource identifiers.

7. The computer-implemented method of claim 5, further comprising:

populating the linked entity database with aggregate numbers of occurrences in the search log for each of the first linked entity resource identifiers; and selecting the set of entities to include in the linked entity context information based at least on the aggregate numbers of occurrences.

8. The computer-implemented method of claim 7, wherein the set of entities is selected by:

sampling from the second linked entity resource identifiers in proportion to the aggregate numbers of occurrences of the second linked entity resource identifiers in the search log.

9. The computer-implemented method of claim 7, wherein the set of entities is selected by:

filtering the second linked entity resource identifiers to remove recently-accessed second linked entity resource identifiers that have been accessed within a specified time period; and sampling from the filtered second linked entity resource identifiers proportionally to the aggregate numbers of occurrences of the second linked entity resource identifiers in the search log.

10. The computer-implemented method of claim 7, wherein the set of entities is selected by:

sampling from the second linked entity resource identifiers in inverse proportion to the aggregate numbers of occurrences of the second linked entity resource identifiers in the search log.

11. The computer-implemented method of claim 7, further comprising:

traversing the public knowledge graph along a path from a particular first linked entity resource identifier to identify a related entity resource identifier of a related entity; and including the related entity in the set of entities of the linked entity context information.

12. A system comprising:

a linked entity database storing first linked entity resource identifiers of linked entities identified by an entity linker by processing a search log for a particular user;

a hardware processing unit; and a storage resource storing computer-readable instructions which, when executed by the hardware processing unit, cause the system to:

receive a current natural language query from the particular user;

generate a contextualized prompt data structure based at least on the current natural language query, the contextualized prompt data structure being personalized for the particular user based at least on linked entity context information derived from the linked entity database;

input the contextualized prompt data structure to a generative language model;

receive a response to the current natural language query generated by the generative language model, wherein the response is conditioned on the linked entity context information included in the contextualized prompt data structure; and reply to the current natural language query based at least on the response.

13. The system of claim 12, wherein the computer-readable instructions, when executed by the hardware processing unit, cause the system to:

generate the contextualized prompt data structure from a prompt data structure template having a static section instructing the generative language model to provide the response in a specified format and a dynamic section populated based on the current natural language query and the linked entity context information.

14. The system of claim 13, wherein the computer-readable instructions, when executed by the hardware processing unit, cause the system to:

populate the dynamic section with at least one field from a currently-visited web page.

15. The system of claim 14, the at least one field being a title of the currently-visited web page or main content of the currently-visited web page.

16. The system of claim 14, wherein the linked entity database includes other first linked entity resource identifiers identified by the entity linker from one or more of word processing documents, emails, or meeting transcripts.

17. The system of claim 12, wherein the current natural language query is a current search query, the contextualized prompt data structure requests the generative language model to generate a suggested search query given the current search query and the linked entity context information, and the response includes the suggested search query.

18. The system of claim 12, wherein the response comprises a summary of a web page, a word processing document, an email, or a meeting transcript, or a new email or new word processing document authored for the user by the generative language model.

19. A computer-readable storage medium storing computer-readable instructions which, when executed by a processing unit, cause the processing unit to perform acts comprising:

receiving a current natural language query from a particular user;

accessing a linked entity database storing first linked entity resource identifiers of linked entities identified by an entity linker by processing a search log for the particular user;

generating a contextualized prompt data structure based at least on the current natural language query, the contextualized prompt data structure being personalized for the particular user based at least on linked entity context information derived from the linked entity database;

inputting the contextualized prompt to a generative machine learning model;

receiving a response to the contextualized prompt generated by the generative machine learning model, wherein the response is conditioned on the linked entity context information; and replying to the current natural language query based at least on the response.

20. The computer-readable storage medium of claim 19, wherein the response includes at least one of natural language or an image generated by the generative machine learning model.

* * * * *